United States Patent [19]
Tanaka et al.

[11] Patent Number: 6,008,612
[45] Date of Patent: Dec. 28, 1999

[54] METHOD FOR DETECTING CONTACT POSITION

[75] Inventors: Toshiki Tanaka; Mitsuyasu Kachi, both of Nagoya, Japan

[73] Assignee: Mitsubishi Denki Kabushiki Kaisha, Tokyo, Japan

[21] Appl. No.: 09/182,207

[22] Filed: Oct. 30, 1998

[51] Int. Cl.⁶ .................................................. G05B 1/06
[52] U.S. Cl. ........................................ 318/652; 318/560
[58] Field of Search ........................ 318/560, 568.16, 318/568.11, 568.1, 638, 652, 671, 677, 265, 266, 609, 610, 565–567, 580

[56] References Cited

U.S. PATENT DOCUMENTS

| | | | |
|---|---|---|---|
| 4,393,342 | 7/1983 | Matsuoka et al. | 318/266 |
| 5,410,226 | 4/1995 | Sekiguchi et al. | 318/266 |
| 5,449,987 | 9/1995 | McMillan | 318/266 |

FOREIGN PATENT DOCUMENTS

| | | |
|---|---|---|
| 58-124907 | 7/1983 | Japan . |
| 60-83110 | 5/1985 | Japan . |
| 60-229113 | 11/1985 | Japan . |

*Primary Examiner*—Robert E. Nappi
*Assistant Examiner*—Rina I. Duda
*Attorney, Agent, or Firm*—Sughrue, Mion, Zinn, Macpeak & Seas, PLLC

[57] ABSTRACT

A movable body is moved towards an object for contact, it is determined whether a representative load for driving load such as a current instruction value for a servo amplifier providing controls for movement of the movable body has exceeded a reference value or not, and when the current instruction value exceeds the reference value, positional data for the body at this point of time is written in a memory, difference between the current instruction value and the reference value at this point of time and on is accumulated, and when the accumulated difference value reaches a specified value, a position indicated by the positional data in the memory is regarded as a contact position.

28 Claims, 22 Drawing Sheets

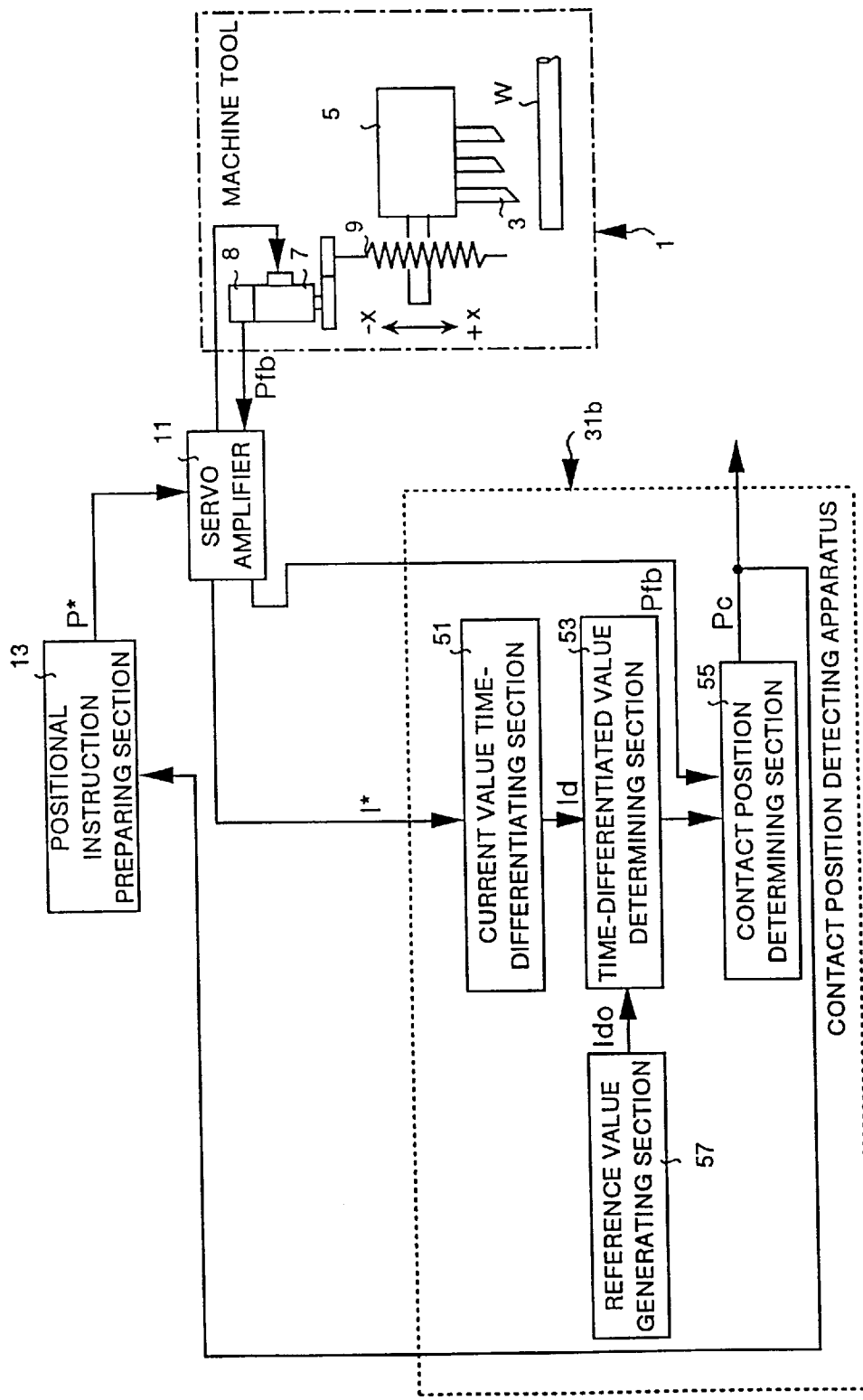

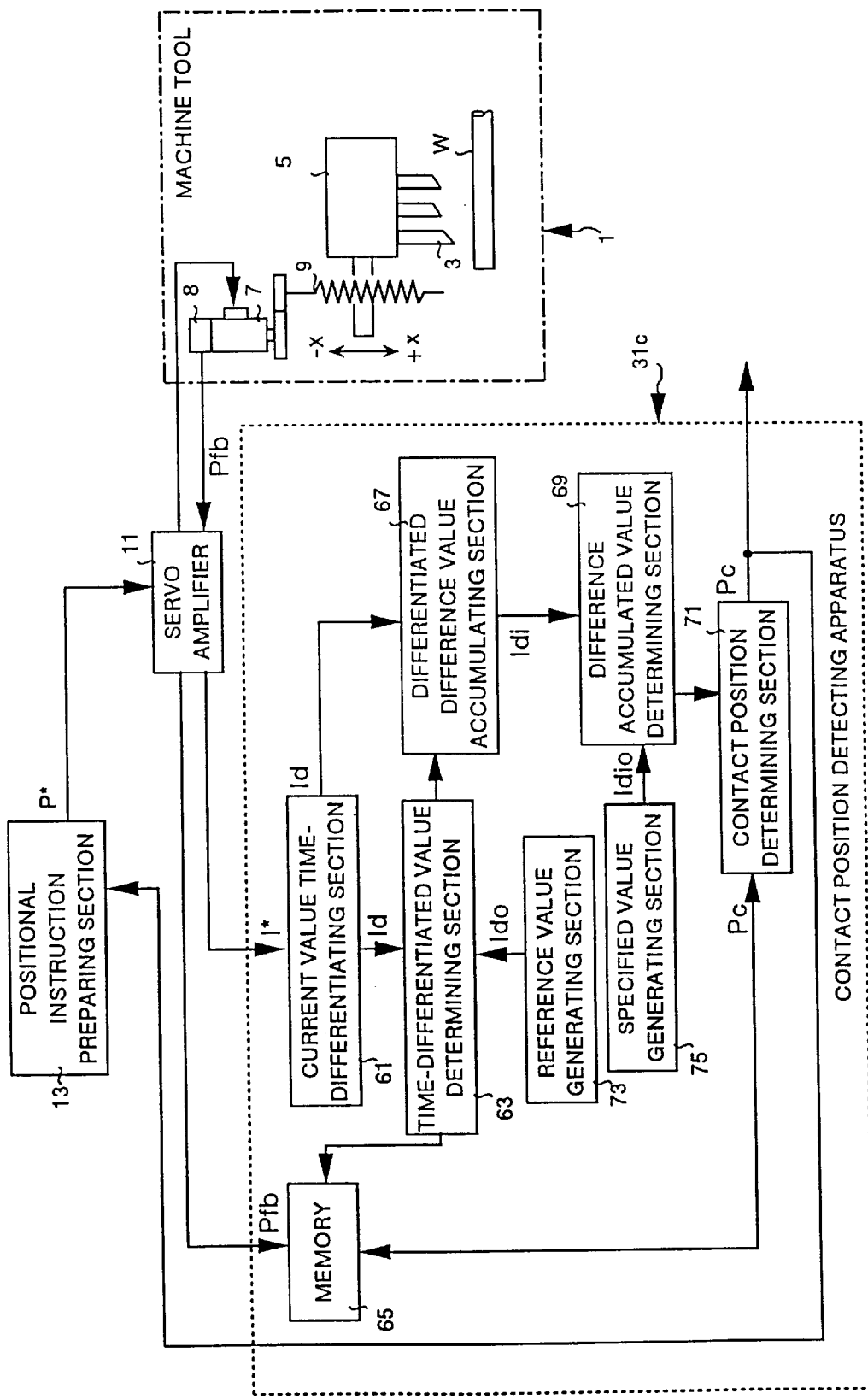

METHOD FOR DETECTING CONTACT POSITION

FIELD OF THE INVENTION

The present invention relates to a method and apparatus for detecting a contact position, and more specifically, to a method and an apparatus to be used in machine tools or industrial machines or robots or the like, for detecting a position at which a movable body, such as a tool or an effector, contacts an object or a position setting member or the like.

BACKGROUND OF THE INVENTION

In conventional technology, there have been known, Japanese Patent Laid-Open Publication No. SHO 60-229113 or 58-124907 or SHO 60-83110 which disclose method and apparatus for detecting a contact between a tool and a work. According to Japanese Patent Laid-Open Publication No. SHO 60-229113, a contact is detected according to a change in the voltage of a servo motor used for feeding the main shaft and a contact position is detected according to an output of a position detector. On the other hand, according to Japanese Patent Laid-Open Publication No. SHO 58-124907 or SHO 60-83110, contact between a slide table and a stopper fixed at a specified position or a stroke restricting section (a reference position setting member) is detected according to a fact that a current flowing through a motor for driving a slide table in the axial direction becomes an excessive current and a contact position is detected according to an output current of a position detector.

In the method and apparatus based on the conventional technology as described above, when a motor voltage or a motor current exceeds a specified value, it is determined that a movable body, such as a tool or a slide table, has established a contact with an object, such as a work or a reference position setting member. Therefore, it may be wrongly determined that a contact between the body and the object has been established when a motor voltage or a motor current exceeds the specified value because of load fluctuations due to an external disturbance or change in mechanical viscosity.

Furthermore, detection of fluctuations in motor load is troublesome because it is affected by cyclical load fluctuation, chalking torque in the motor, or motor load fluctuation caused by a feed screw, which makes it impossible to detect a contact position with high precision.

SUMMARY OF THE INVENTION

It is an object of the present invention to provide a contact position detecting method enabling high precision and high reliability contact position detection without committing incorrect detection and a contact position detecting apparatus used for carrying out the method.

With a contact position detecting method according to the present invention, a contact is determined based on a difference-accumulated value between a representative value for driving load and a reference value, and a position, indicated by positional data for the body at a point of time when the representative value for driving load exceeds a reference value, is regarded as a contact position.

With a contact position detecting method according to the present invention, a contact is determined based on a time-differentiated value for a representative value for driving load, and a contact position is indicated by positional data for the body at a point in time when a time-differentiated value for the representative value for driving load exceeds the reference value.

With a contact position detecting method according to the present invention, a contact is determined based on an accumulated value of a difference between a time-differentiated value for a representative value for driving load and a reference value, and a position, indicated by positional data for the body at a point in time when the time-differentiated value for the representative value for driving load exceeds the reference value, is regarded as a contact position.

With a contact position detecting method according to the present invention, a contact is determined based on a difference-accumulated value between a time-differentiated value for a representative value for driving load and a reference value, and when a difference-accumulated value for this time-differentiated value exceeds a specified value, the point in time when the representative value for driving load exceeded a preset reference value is estimated from an average value of the time-differentiated value from a point in time when the time-differentiated value exceeded the reference value until a point of time when the difference-accumulated time reaches a specified time, and a position, indicated by positional data for the body at the estimated time, is regarded as a contact position.

With a contact position detecting method according to the present invention, a representative value for driving load with cyclical noise removed therefrom is used.

With a contact position detecting method according to the present invention, a representative value for driving load with a cyclic load fluctuation component for one rotation of a motor is used.

With a contact position detecting method according to the present invention, a representative value for driving load with a load fluctuation component during movement of the body removed therefrom is used.

With a contact position detecting method according to the present invention, a load fluctuation component with a constant cycle and a constant amplitude specified to a motor is canceled from a current instruction by way of feed forward correction and a current instruction value before the feed forward correction or a speed integration instruction value in PI controls is used as a representative value for driving load.

With a contact position detecting method according to the present invention, a component for external disturbance is excluded by executing a feed forward correction to a current instruction according to an external disturbance current compensation value obtained with an external disturbance observer, and a current instruction value before the feed forward correction or a speed integration instruction value in PI controls is used as a representative value for driving load.

With a contact position detecting method according to the present invention, when the body contacts the object, the body is immediately moved away from the object.

With a contact position detecting apparatus according to the present invention, a contact is determined based on a difference accumulated value between a representative value for driving load and a reference value, and when the difference accumulated value exceeds a specified value, a position indicated by positional data at a point in time when the difference accumulated value exceeds the representative value for driving load is regarded as a contact position.

With a contact position detecting apparatus according to the present invention, a contact is determined based on a time-differentiated value for a representative value for driving load, and a position is indicated by positional data for the body at a point in time when a time-differentiated value for the representative value for driving load exceeds a specified value.

With a contact position detecting apparatus according to the present invention, a contact is determined based on a difference accumulated value between a time-differentiated value for a representative value for driving load and a reference value, and when a difference accumulated value for this time-differentiated value exceeds a specified value, a position indicated by positional data at a point in time when the time differentiated value for the representative value for driving load exceeds the reference value is regarded as a contact position.

With a contact position detecting apparatus according to the present invention, a contact is determined based on a difference accumulated value between a time-differentiated value for a representative value for driving load and a reference value, and when the difference accumulated value for this time-differentiated value exceeds a specified value, a point in time when the representative value for driving load exceeds a preset reference value is estimated from an average value of the time-differentiated value from the point of time when the time-differentiated value exceeds the reference value until a point in time when the difference accumulated value reaches a specified time, and a position, indicated by the positional data at the estimated point of time, is regarded as a contact position.

With a contact position detecting apparatus according to the present invention, a representative value for driving load with cyclic noise removed therefrom is used.

With a contact position detecting apparatus according to the present invention, a representative value f or driving load with a cyclic load fluctuation component for one rotation of a motor removed therefrom is used.

With a contact position detecting apparatus according to the present invention, a representative value for driving load with a load fluctuation component du ring movement of the body removed therefrom is used.

With a contact position detecting apparatus according to the present invention, a load fluctuating on component, with a constant cycle and a constant amplitude specified to a motor, is canceled in a current instruction by way of feed forward correction, and a current instruction before feed forward correction or a speed integration instruction value in PI controls is used as a representative value for driving load.

With a contact position detecting apparatus according to the present invention, an external disturbance component is excluded according to an external disturbance compensation current value with an external disturbance observer by way of executing feed forward correction for a current instruction, and a current instruction value before feed forward correction or a speed integration instruction value in PI controls is used as a representative value for driving load.

With a contact position detecting apparatus according to the present invention, when the body contacts the object, the body is immediately moved away from the object.

Other objects and features of this invention will become clear from the following description with reference to the accompanying drawings.

BRIEF DESCRIPTION OF THE DRAWING

FIG. 5 is a block diagram showing Embodiment 2 of the contact position detecting apparatus according to the present invention;

FIG. 8 is a block diagram showing Embodiment 3 of the contact position detecting apparatus according to the present invention;

DESCRIPTION OF THE PREFERRED EMBODIMENTS

Detailed description is made of embodiments of the contact position detecting method and contact position detecting apparatus, each according to the present invention, with reference to the attached drawings.

FIG. 1 to FIG. 4C show Embodiment 1 of the contact position detecting apparatus according to the present invention.

Figure 1:
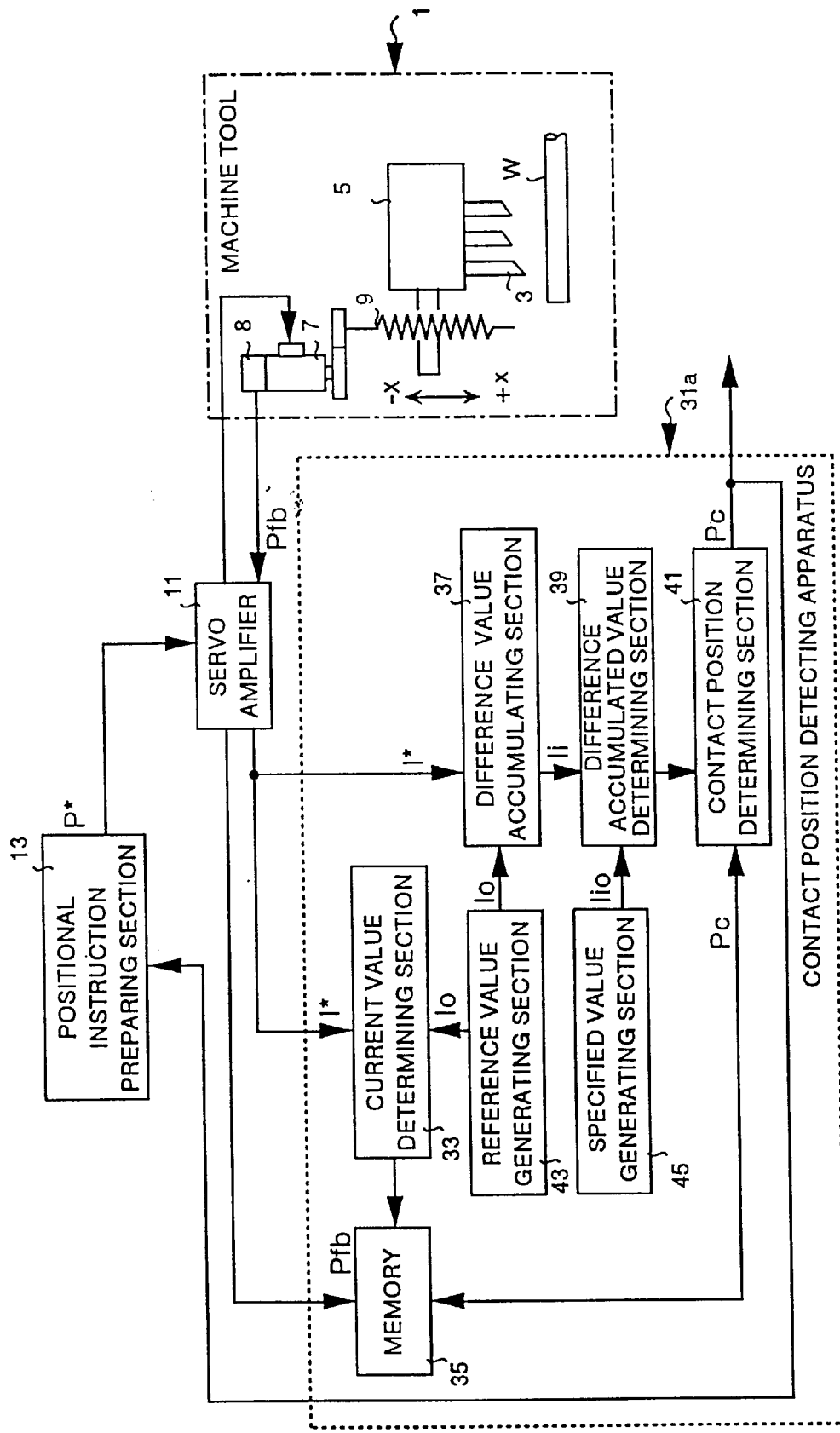
FIG. 1 is a block diagram showing Embodiment 1 of a contact position detecting apparatus according to the present invention.

In FIG. 1, the reference numeral 1 indicates a machine tool based on a numerical control system. The machine tool 1 has a tool base 5 holding a tool 3 which is a movable body, and the tool base 5 is moved by a feed screw 9 driven by a servo motor 7 towards or away from a work W which is an object for contact, for instance, along the X direction.

Voltage of the servo motor 7 is controlled by a servo amplifier (servo controller) 11. The servo amplifier 11 receives a positional instruction value (positional instruction signal) P* from a positional instruction preparing section 13 in a numerical control section and a positional feedback value (positional feedback signal) Pfb from a rotary encoder (pulse generator P.G) provided as a slave component to the servo motor 7, and provides positional controls in the feedback compensation system by controlling a power supply of the servo motor 7.

Figure 2:
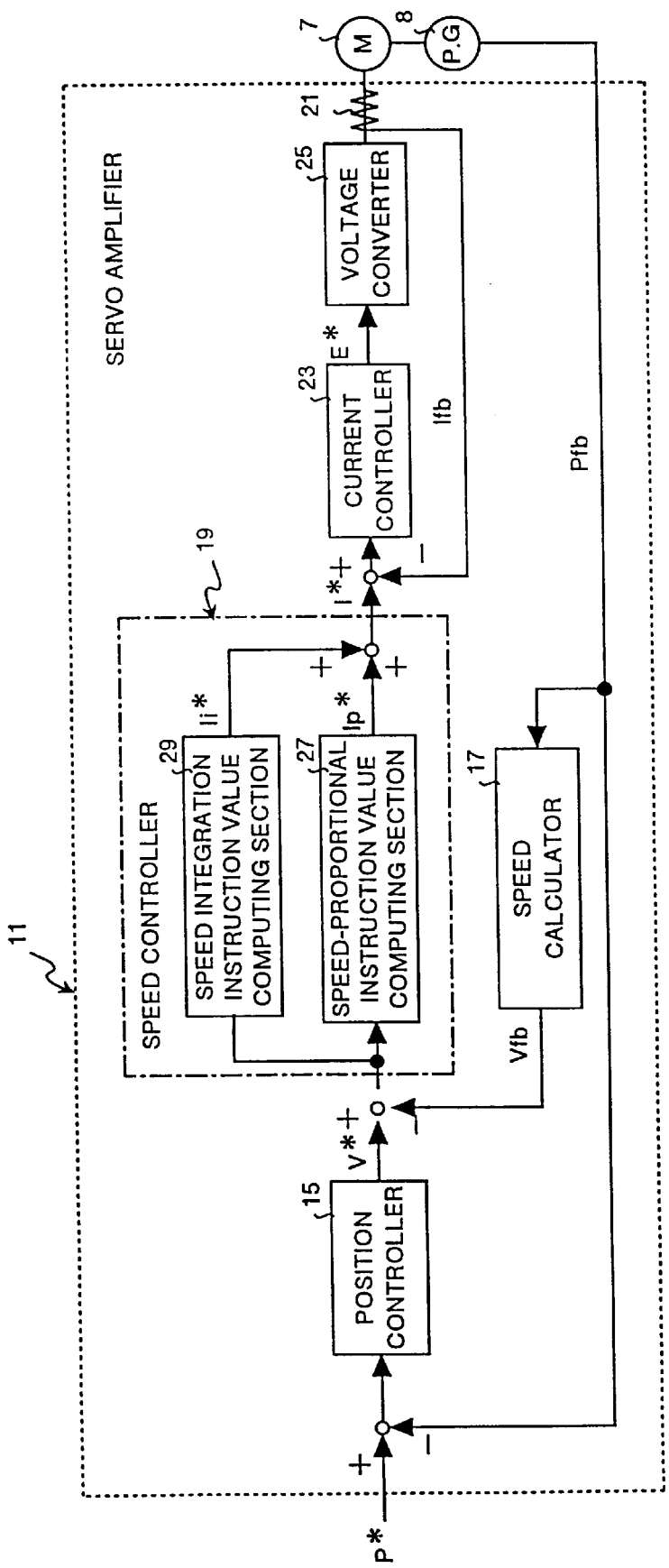
FIG. 2 is a block diagram showing a servo amplifier in Embodiment 1 of the contact position detecting apparatus according to the present invention.

FIG. 2 is a particular example of the servo amplifier 11. This servo amplifier 11 is based on a general control system in which a positional control loop is a main loop and a speed control loop and a current control loop are minor loops. The servo amplifier 11 comprises a position controller 15 for generating a positional instruction value (positional instruction signal) V*, corresponding to a difference between the positional instruction value P* and the positional feedback value Pfb; a speed controller 19 for generating a current instruction value (current instruction signal) I*, corresponding to a difference between a speed instruction value V* and a speed feedback value Vfb provided by a speed calculator 17; a current controller 23 for generating a voltage instruction value (voltage instruction signal) E*, corresponding to a difference between the current instruction value I* and a current feedback value Ifb provided by a current detector 21; and a voltage converter 25 comprising an inverter or the like for controlling a voltage given to the servo motor 7 in response to a voltage instruction value (voltage instruction signal) E* from the current controller 23.

The speed controller 19 provides PI controls and has a speed-proportional instruction value computing section 27 for computing a speed-proportional instruction value (P component) IP* and a speed integration instruction value computing section 29 for computing a speed integration instruction value (I component) Ii*, adding the speed-proportional instruction value Ip* to the speed integration instruction value Ii*, and outputting the current instruction value I*.

In FIG. 1, a contact position detecting apparatus 31a comprises a current value determining section 33 which is a means for determining driving load representative value, a memory 35, a difference value accumulating section 37, a difference accumulated value determining section 39, and a contact position determining section 41.

The current value determining section 33 receives a current value I* which is a representative value for driving a load during movement of the tool 3 toward the work W (for instance, in the +X-axial direction) from the servo amplifier 11, and makes a determination as to whether the current instruction value I* has exceeded a preset reference value Io previously set by a reference value generating section 43.

The memory 35 stores therein a positional feedback value Pfb from the rotary encoder 8 at a point of time when the current instruction value I* exceeds the reference value Io as temporal contact position data for the tool 3.

The difference value accumulating section 37 accumulates a difference value (I*−Io) at the point of time when the current instruction value I* exceeds the reference value Io.

The difference accumulated value determining section 39 makes a determination as to whether a difference accumulated value Ii obtained by the difference value accumulating section 37 has reached a specified value Iio previously set by a specified value generating section 45 or not. The difference accumulated value determining section 39 determines, when the difference accumulated value Ii reaches the specified value Iio, that contact has occurred.

The contact position determining section 41 reads out the contact position data stored in the memory section 35, when it is determined that the difference accumulated value Ii has reached the specified value Iio and contact has occurred, and regards a position indicated by the positional data as a contact position Pc.

When it is determined that contact has occurred, the contact position determining section 41 reports the fact to the positional instruction preparing section 13, and immediately provides controls for moving the tool 3 away from the work W (for instance, in the −X direction).

Operations of the contact position detecting apparatus 31a having the configuration as described above are explained with reference to FIG. 3 and FIGS. 4A to 4C.

Figure 3:
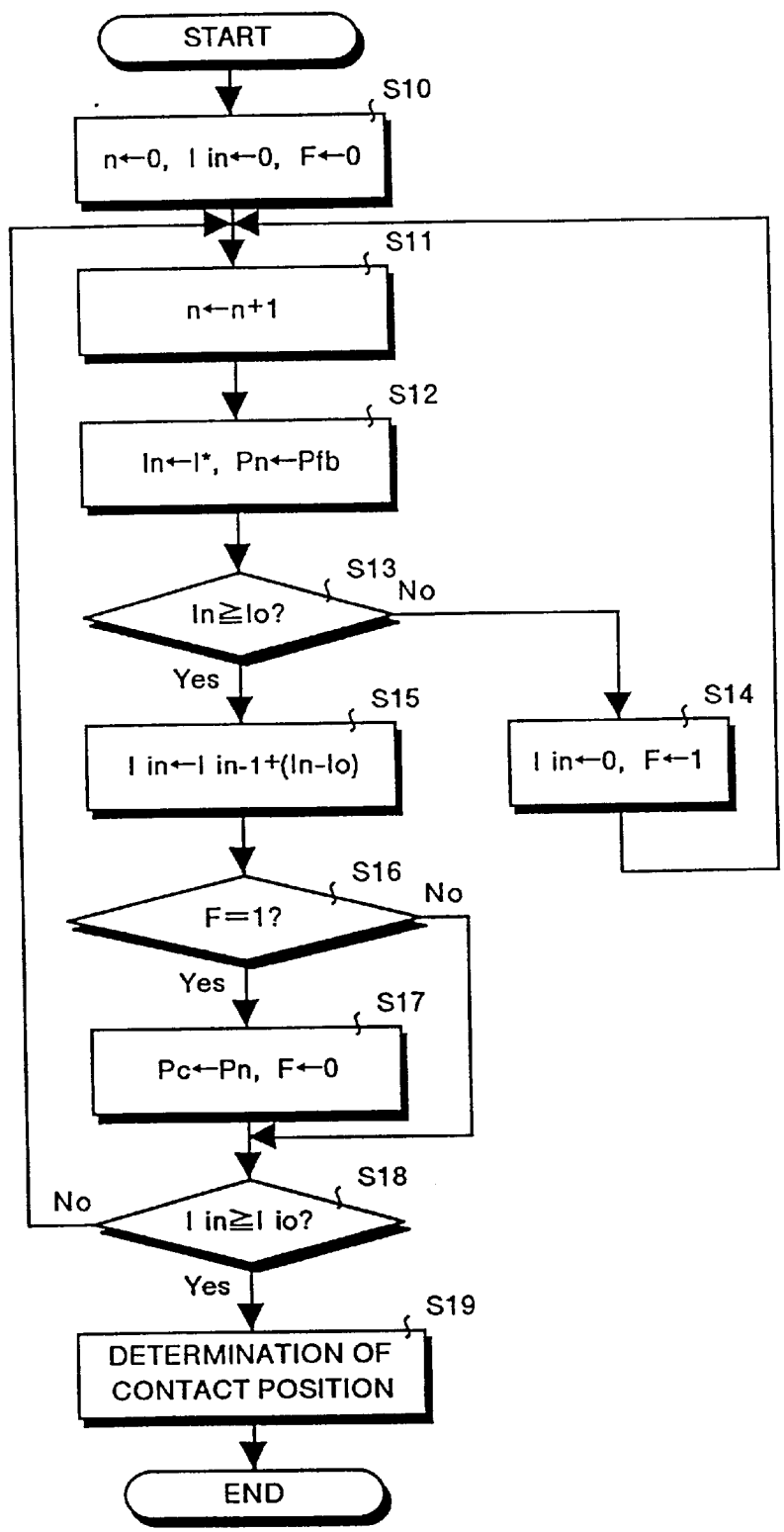
FIG. 3 is a flow chart showing an operational flow in Embodiment 1 of the contact position detecting apparatus according to the present invention.

FIG. 3 shows a flow of operations of the contact position detecting apparatus, and at first, as processing for initialization, a processing counter n is set to 0, a difference accumulated value Iin to 0, and a flag F for resetting an accumulated value to 0 (step S10), the tool base 5 and the tool 3 are moved at a slow but constant speed by the servo motor 7 in the +X direction before entering the processing loop.

When the processing loop is started, the processing counter n is incremented (step Sll), and the current instruction value I* and positional feedback value Pfb at the point in time are fetched as In and Pn respectively (step S12), and determination is made by the current value determining section 33 as to whether the current instruction value In has exceeded the reference value Io or not (step S13). When it is determined that the condition In≧Io is not satisfied (step S13), the difference accumulated value Iin is reset to 0 (zero) with the flag F for resetting the accumulated value set to 1, and then system control is returned to the beginning of the processing loop (step S14).

On the contrary, when it is determined that the condition In≧Io is satisfied (step S13), then the difference value accumulating section 37 computes a difference (In−Io), and adds the result to the difference accumulated value Iin-1 to update the difference accumulated value Iin (step S15).

A determination is made as to whether the flag F for resetting an accumulated value is equal to 1 or not (step 16). When F is equal to 1 (step S16), it indicates that the state of In<Io has just shifted to In≧Io (the time te or to in FIGS. 4A to 4C), and then the positional feedback value Pn at this point of time is written as temporal contact position data Pc in the memory 35, and the flag F for resetting the accumulated value is reset to 0 (step S17).

On the contrary, if F is not equal to 1 (step S16), the contact position data Pc is not updated and the flag is also not reset.

Then, the difference accumulated value determining section 39 determines whether the current difference accumulated value Iin has reached the specified value Iio or not (step S18). If the condition Iin≧Iio is not satisfied (step S18), system control returns to the beginning of the processing loop.

On the contrary, if the condition Iin≧Iio is satisfied (step S18), in other words, if it the difference accumulated value Iin has reached the specified value Iio (time tc in FIGS. 4A to 4C), it is determined that a contact has occurred, and the contact position determining section 41 reads out the temporal contact position data Pc (positional feedback value Pn at the time point to) stored in the memory 35 and regards a position indicated by the contact position data Pc as a contact position (step S19).

When it is determined that contact has occurred, the tool 3 is immediately moved away from the work W at a high speed in the −X direction. With this operation, the tool 3 is prevented from being strongly pressed to the work W, and also chipping of the tool 3 and biting of the tool 3 into the work W can be prevented.

Determination of contact is executed as described above, and as shown in FIGS. 4A to 4C, even if load fluctuation is generated, for instance, by a feed screw or the like, namely even if the condition In≧Io is temporally satisfied due to an external disturbance, as the condition of Iin≧Iio is not satisfied in a case of an external disturbance, so that the position at the time tc is never incorrectly determined as a contact position. Thus a contact position is accurately detected according to the positional data Pc only at the time when the tool 3 has actually contacted the work W and the condition In≧Io has been satisfied.

Figure 4A:
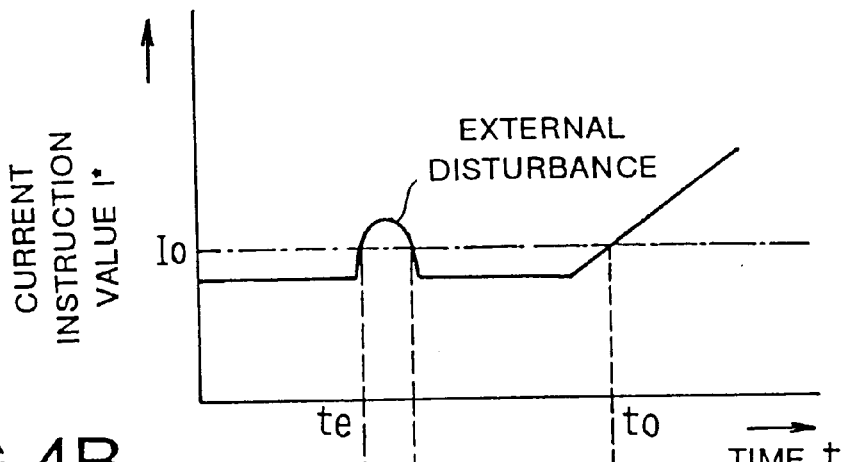
FIG. 4A is a graph showing change of a current instruction value.
Figure 4B:
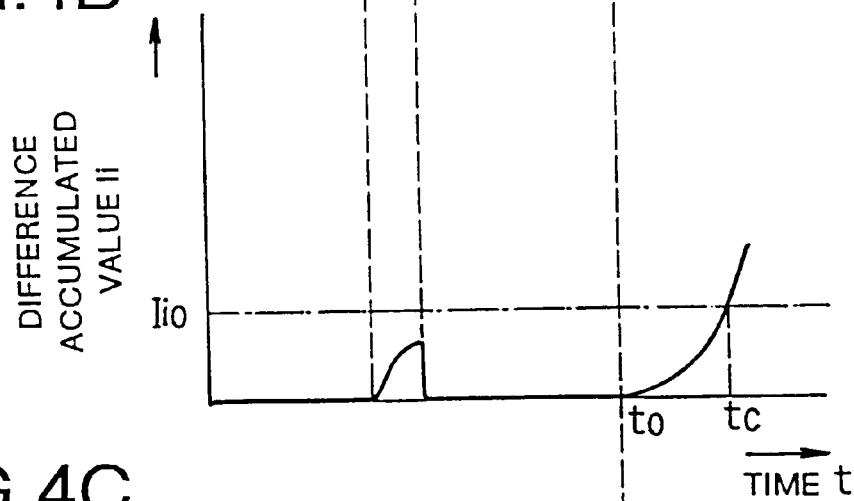
FIG. 4B is a graph showing change of a difference accumulated value.
Figure 4C:
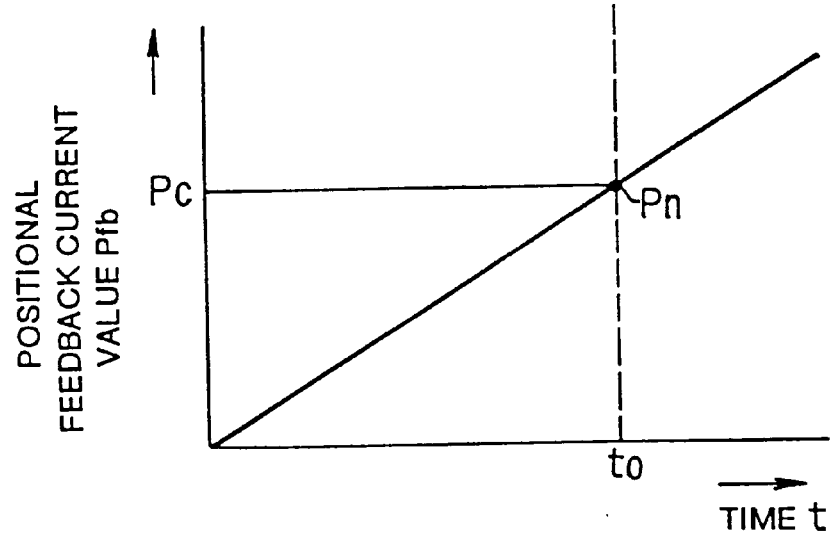
FIG. 4C is a graph showing change of a positional feedback value.

FIG. 4A shows change of the current Instruction value I* with time, FIG. 4B shows change of the difference accumulated value Ii with time, and FIG. 4C shows change of the positional feedback current Pfb with time.

Although the current instruction value I* is used as a representative value for driving load in this embodiment, any one of the speed integration instruction value Ii* and current feedback value Ifb in PI controls may be used as the representative value for driving load, and as positional difference is always kept at a small value during forward movement of a tool at a slow and constant speed for detection of a contact position, all of the values are equivalent.

FIG. 5 to FIG. 7C show Embodiment 2 of the contact position detecting apparatus according to the present invention. The same reference numerals are assigned to sections corresponding to those in FIG. 1 and description thereof is omit ted herein.

The contact position detecting apparatus 31b comprises a current value time-differentiating section 51, a time-differentiated value determining section 53, and a contact position determining section 55.

The current value time-differentiating section 51 receives the current instruction value I* during movement of the tool 3 toward the work W (f or instance, in the +X direction) from the servo amplifier 11, and subjects the current instruction value I* to time differentiation. The current time-differentiated value Id indicates a rate of change of the current instruction value I* per unit time.

The time-differentiated value determining section 53 determines whether the current time-differentiated value Id computed by the current value time differentiating section 51 has exceeded a reference value Ido previously set by the reference value generating section 57. The time-differentiated value determining section determines, when the current time-differentiated value Id exceeds the reference value Ido, that a contact has occurred.

The contact position determining section 55 regards, when it is determined that the current time-differentiated value Id has exceeded the reference value Ido and contact has occurred, a position indicated by positional data for the tool 3 (positional feedback value Pfb) at the point in time as a contact position.

When it is determined that a contact has occurred, the contact position determining section 55 reports the fact to the positional instruction preparing section 13 and immediately moves the tool 3 away from the work W (for instance, in the −X direction).

Operations of the contact position detecting apparatus 31b having the configuration as described above are explained with reference to FIG. 6 and FIGS. 7A to 7C.

Figure 6:
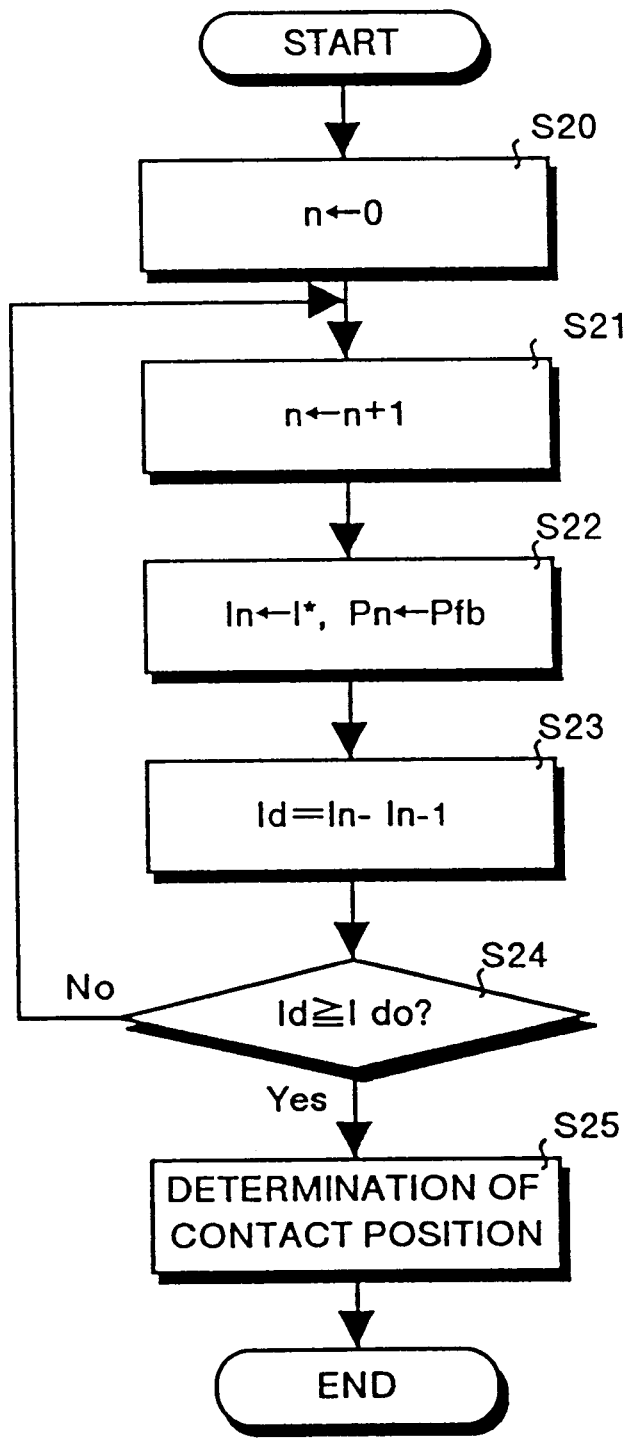
FIG. 6 is a flow chart showing an operational flow in Embodiment 2 of the contact position detecting apparatus according to the present invention.

FIG. 6 is a flow of operations of the contact position detecting apparatus 31b, and at first, as processing for initialization, the processing count n is set to 0 (step S20) and the tool base 5 and tool 3 are moved at a slow but constant speed by the servo motor 7 in the +X direction before entering the processing loop.

Once entered in the processing loop, the processing counter n is incremented (step S21), and the current instruction value I* and the positional feedback value Pfb are fetched as In and Pn respectively (step S22).

Then the current value time-differentiating section 51 calculates a time differentiation of the current instruction value In. In this time differentiation, a difference between the latest current instruction value In and a current instruction value In−1, one cycle before, is computed to obtain the current time-differentiated value Id (step S23).

Then a determination Is made by the time-differentiated value determining section 53 as to whether the current time-differentiated value Id has exceeded the reference value Io or not (step S24). If the condition Id≧Ido is not satisfied (step S24), system control returns to the beginning of the processing loop.

On the contrary, if the condition Id≧Io (step S24) is satisfied, namely if it is determined that the current time-differentiated value Id has exceeded the reference value Ido, it is determined that a contact has occurred, and a position indicated by the positional feed back value Pn=positional data Pc at this time tc (Refer to FIGS. 7A to 7C), is regarded as a contact position (step S25).

When it is determined that a contact has occurred, the tool 3 is immediately moved away from the work W in the −X direction at a high speed. With this operation, the tool 3 is prevented from being strongly pressed to the work W, and also chipping of the tool 3 and biting of the tool 3 into the work W can be prevented.

Figure 7A:
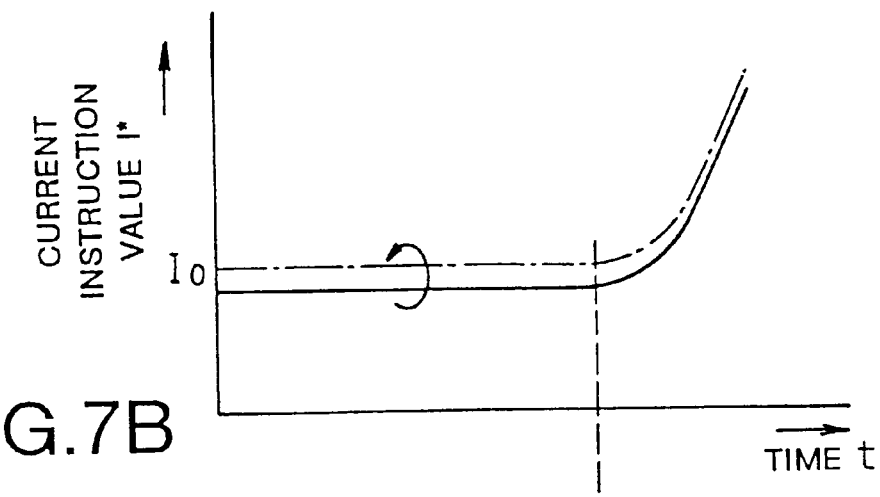
FIG. 7A is a graph showing change of a current instruction value.

Determination of contact is made as described above, so that, as indicated by the arrow mark in FIG. 7A, even if DC for load data during constant feed fluctuates due to change in viscosity of a machine or the like, incorrect detection is not performed and a contact position is detected with high reliability.

Figure 7B:
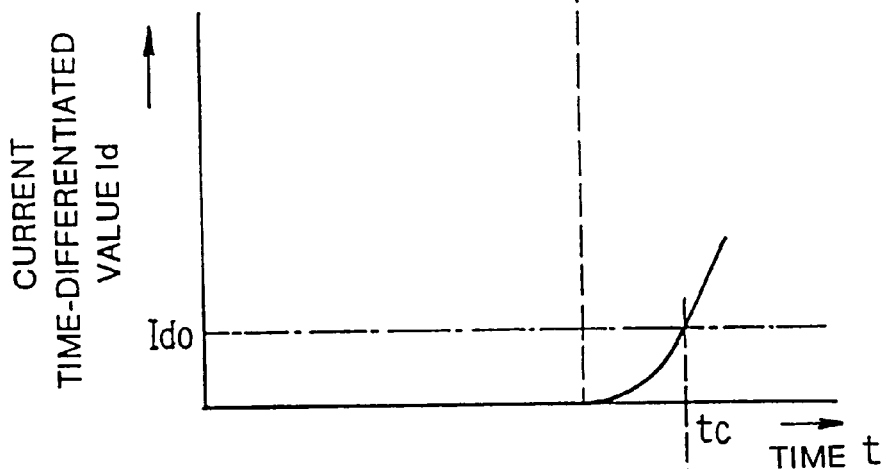
FIG. 7B is a graph showing change of a difference accumulated value.
Figure 7C:
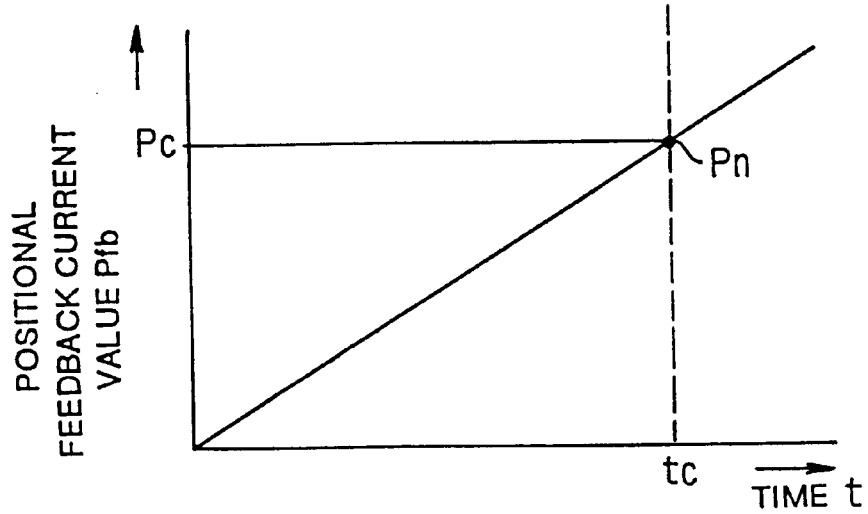
FIG. 7C is a graph showing change of a positional feedback value.

It should be noted that FIG. 7A shows change of the current instruction value I* with time, FIG. 7B shows change of the current time-differentiated value Id with time, and FIG. 7C shows change of the positional feedback value Pfb with time.

Also in this embodiment, in addition to the current instruction value I*, any one of the speed integration instruction value Ii* and current feedback value Ifb in PI controls may be used as a representative value for driving load, and determination of contact may be made according to a time-differentiated value for any of these values.

FIG. 8 to FIG. 10D show Embodiment 3 of the contact position detecting apparatus according to the present invention. In FIG. 8, the same reference numerals are assigned to sections corresponding to those in FIG. 1 and description thereof is omitted herein.

A contact position detecting apparatus 31c comprises a current value time-differentiating section 61, a time-differentiated value determining section 63, a memory 65, a differentiated difference value accumulating section 67, a difference accumulated value determining section 69, and a contact position determining section 71.

The current value time-differentiating section 61 receives the current instruction value I* during movement of the tool 3 toward tile work W (for instance, in the +X direction) from the servo amplifier 11, and subjects the current instruction value I* to time differentiation.

The time-differentiated value determining section 63 determines whether the current ti-me-differentiated value Id, computed by the current value time-differentiating section 61, has exceeded the reference value Ido previously set by the reference value generating section 73.

The memory 65 stores the positional feedback value Pfb obtained by the rotary encoder 8 at a point in time when the current time-differentiated value Id exceeds the reference value Ido as temporal contact position data.

The differentiated difference value accumulating section 67 accumulates a difference (Id−Ido) at the point in time when the current time-differentiated value Id exceeds the reference value Ido.

The difference accumulated value determining section 69 determines whether the difference accumulated value Idi computed by the differentiated difference value accumulating section 67 has reached a specified value Idio previously set by the specified value generating section 75 or not. The difference accumulated value determining section 69 determines, when the difference accumulated value Idi has reached the specified value Idio, that a contact has occurred.

The contact position determining section 71 reads out, when it is determined that the difference accumulated value Idi has reached the specified value Idio and contact has occurred, the positional data stored in the memory 65, and regards a position indicated by the positional data as a contact position.

When it is determined that contact has occurred, also in this case, the contact position determining section 71 reports the fact to the positional instruction preparing section 13, and immediately provides controls for moving the tool 3 away from the work W (for instance, in the −X direction) at a high speed.

Operations of the contact position detecting apparatus 31c having the configuration as described above are explained with reference to FIG. 9 and FIGS. 10A to 10D.

Figure 9:
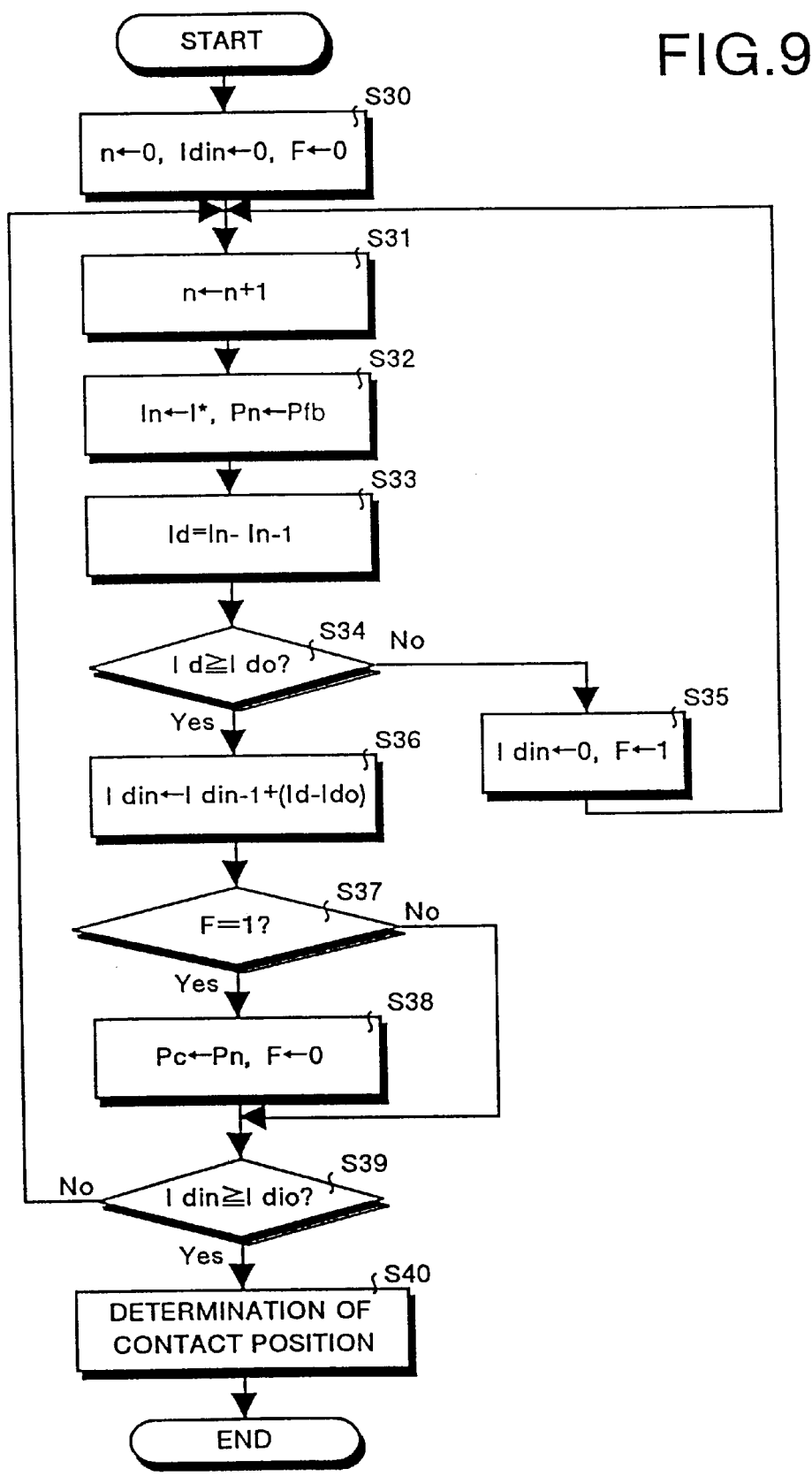
FIG. 9 is a flow chart showing an operational flow in Embodiment 3 of the contact position detecting apparatus according to the present invention.

FIG. 9 shows a flow of operations of the contact position detecting apparatus 31c, and at first, as processing for initialization, the processing counter n is set to 0, the difference accumulated value Idin to 0, and the flag F for resetting the accumulated value to 0 (step S30), and the tool base 5 and the tool 3 are moved at a slow but constant speed in the +X direction by the servo motor 7 before entering the processing loop.

When the processing loop is entered, the processing counter n is incremented (step S31), and the current instruction value I* and positional feedback value Pfb at this point in time are fetched as In and Pn respectively (step S32).

Then the current instruction value In is subjected to time differentiation by the current value time-differentiating section 61. In this time differentiation, a difference between the latest current instruction value In and the current instruction value In−1, one cycle before, is computed to obtain the current time-differentiated value Id(step S33).

Then, the time-differentiated value determining section 63 determines whether the current time-differentiated value Id has exceeded the reference value Ido (step S34). If the condition Id≧Ido is not satisfied (step S34), the difference accumulated value Idin is reset to 0, the flag F for resetting the accumulated value is set to 1, and system control returned to the beginning of the processing loop (step S35).

On the other hand, if the condition Id≧Ido is satisfied (step S34), namely if it is determined that the current time differentiated value Id has exceeded the reference value Ido, the differentiated difference value accumulating section 67 computes a difference (Id−Ido) and adds the computed difference to the difference accumulated value Idin−1 up to that point in time to update the difference accumulated value Idin (step S36).

Then it is determined whether the flag F1 for resetting the accumulated value is equal to 1 or not (step S37). When F=1 (step S37), this indicates that the state of Id>Ido has just shifted to Id≧Ido (represented by time te or tc in FIGS. 10A to 10D), and in that case, the positional feedback value Pn at this point in time is written as contact position data Pc in the memory 65, and the flag F for resetting the accumulated value is reset to 0 (step S38).

On the contrary, if F is not equal to 1 (step S37), the contact position data Pc is not updated and the flag F is also not reset.

Then the difference accumulated value determining section 69 determines whether the current difference differentiated value Idin has reached the specified value Idio or not (step S39). If the condition Idin≧Idio is not satisfied (step S39), system control returns to the beginning of the processing loop.

On the other hand, if the condition Idin≧Idio (step S36) is satisfied, or in other words, it is determined that the difference accumulated value Idin has reached the specified value Idio (time tcd in FIGS. 10A to FIG. 10D), then it is determined that a contact has occurred, the contact position determining section 71 reads out a temporary position data Pc (positional feedback value Pn at the time tc) stored in the memory 65, and a position indicated by the contact position data Pc is regarded as a contact position (step S40).

When it is determined that a contact has occurred, also in this case, the tool 3 is immediately moved away from the work W in the −X direction at a high speed. With this operation, the tool 3 is prevented from being strongly pressed to the work W, and also chipping of the tool 3 and biting of the tool 3 into the work W can be prevented.

As determination of contact is made as described above, as indicated by the arrow mark in FIG. 10A, even if DC of load data during feed at a constant speed is changed due to change in viscosity of a machine or due to other reasons, incorrect detection of contact is not performed, and a contact position is detected with high reliability. Also as shown in FIGS. 10A to 10D, even if load fluctuations are generated by a feed screw or the like, in other words, even if Id temporally becomes equal to or larger than Ido (Id≧Ido), the condition of Idin≧Idio is never satisfied. Therefore, a position in such a case is not incorrectly regarded as a contact position, and a contact position is detected according to the positional data Pc at the time tc when the tool 3 has actually contacted the work W and the condition of Id≧Ido is satisfied.

Figure 10A:
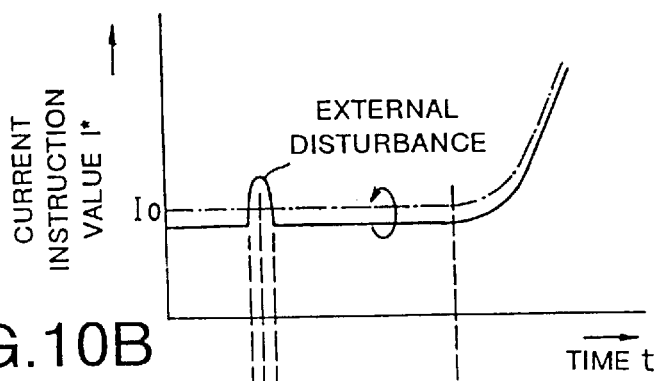
FIG. 10A is a graph showing change of a current instruction value.
Figure 10B:
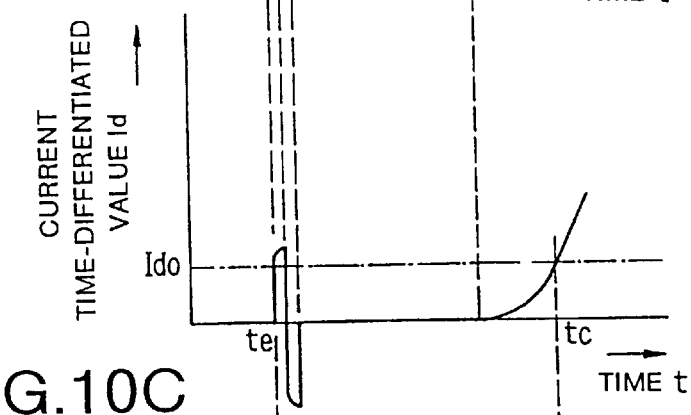
FIG. 10B is a graph showing change of a current time-differentiated value.
Figure 10C:
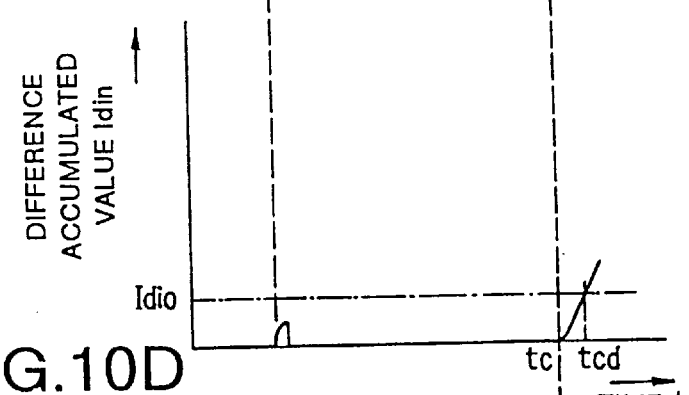
FIG. 10C is a graph showing change of a difference accumulated value.
Figure 10D:
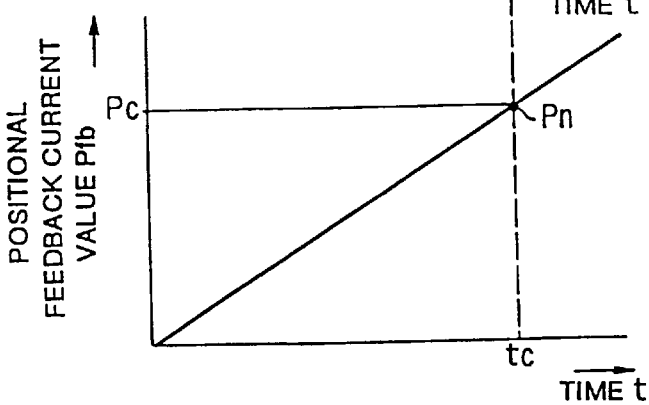
FIG. 10D is a graph showing change of a positional feedback value.

It should be noted that FIG. 10A shows change of the current instruction I* with time, FIG. 10B indicates change of the current time-differentiated value Id with time, FIG. 10C shows change of the difference accumulated value Idin with time, and FIG. 10D shows change of the positional feedback value Pfb with time.

Also in this embodiment, in addition to the current instruction value I*, any one of the speed integration instruction value Ii* in PI controls and current feedback value Ifb may be used as a representative value for driving load, and determination of contact may be made according to a difference accumulated value between a time-differentiated value for any of these values and a reference value.

Figure 11:
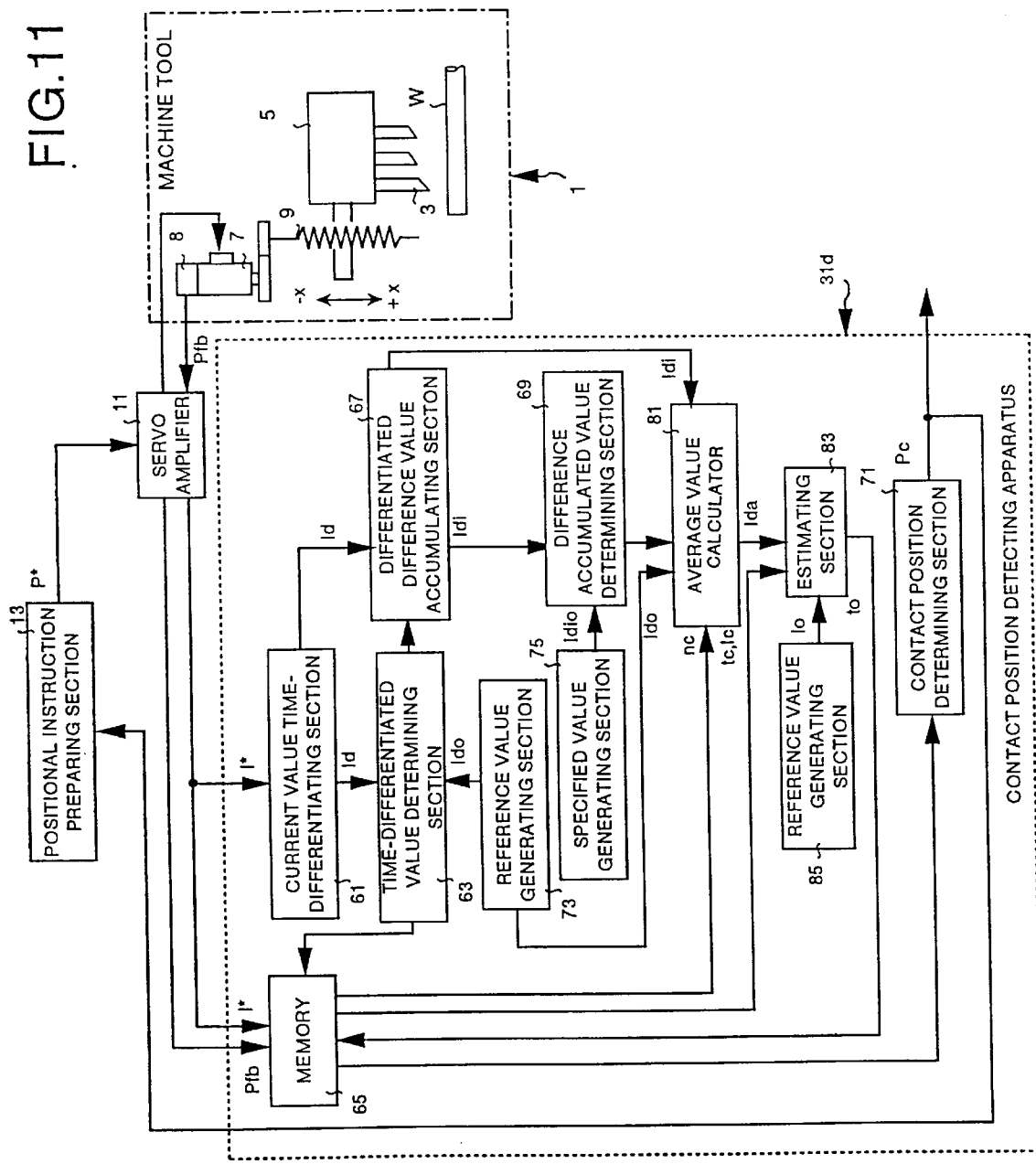
FIG. 11 is a block diagram showing Embodiment 4 of the contact position detecting apparatus according to the present invention.

FIG. 11 to FIG. 13D show Embodiment 4 of the contact position detecting apparatus according to the present invention. In FIG. 11, the same reference numerals are assigned to sections corresponding to those in FIG. 8 and description thereof is omitted herein.

Embodiment 4 is an application of Embodiment 3, and the contact position detecting apparatus according to Embodiment 4 comprises, in addition to the current value time-differentiating section 61, time-differentiated value determining section 63, memory 65, differentiated difference value accumulating section 67, difference accumulated value determining section 69, contact position determining section 71, an average value calculator 81, and an estimating section 83. The current value differentiating section 61, time-differentiated value determining section 63, differentiated difference value accumulating section 67, and difference accumulated value determining section 69 are the same as those in Embodiment 3.

The memory 65 stores therein positional data Pn (positional feedback value Pfb) for the tool 3 during movement of the tool 3 towards the work W, and also stores a point in time when a time differentiated value Id for the current instruction value I* has reached the reference value Ido and the current instruction value I* at the point in time.

When a difference accumulated value Idi of the time differentiated value Id for the current instruction value I* reaches a preset specified value Idio, the average value calculator 81 computes an average time Ida for the time differentiated value Id in a time zone from a point in time when the time differentiated value Id exceeds the reference value Ido until a point in time when the difference value accumulated value reaches the specified value Idio.

The estimating section 83 estimates a point in time at which the current instruction value I* exceeds a reference value Io previously set by the reference value generating section 85 from an average value Ida of the time-differentiated value Id computed by the average value calculator 81.

The contact position determining section 71 reads out positional data at the time estimated by the estimating section 83 from the memory 65, and regards a position indicated by the positional data as a contact position.

Next, operations of the contact position detecting apparatus 31*d* having the configuration as described above are explained with reference to FIG. 12 and FIGS. 13A to 13D.

Figure 12:
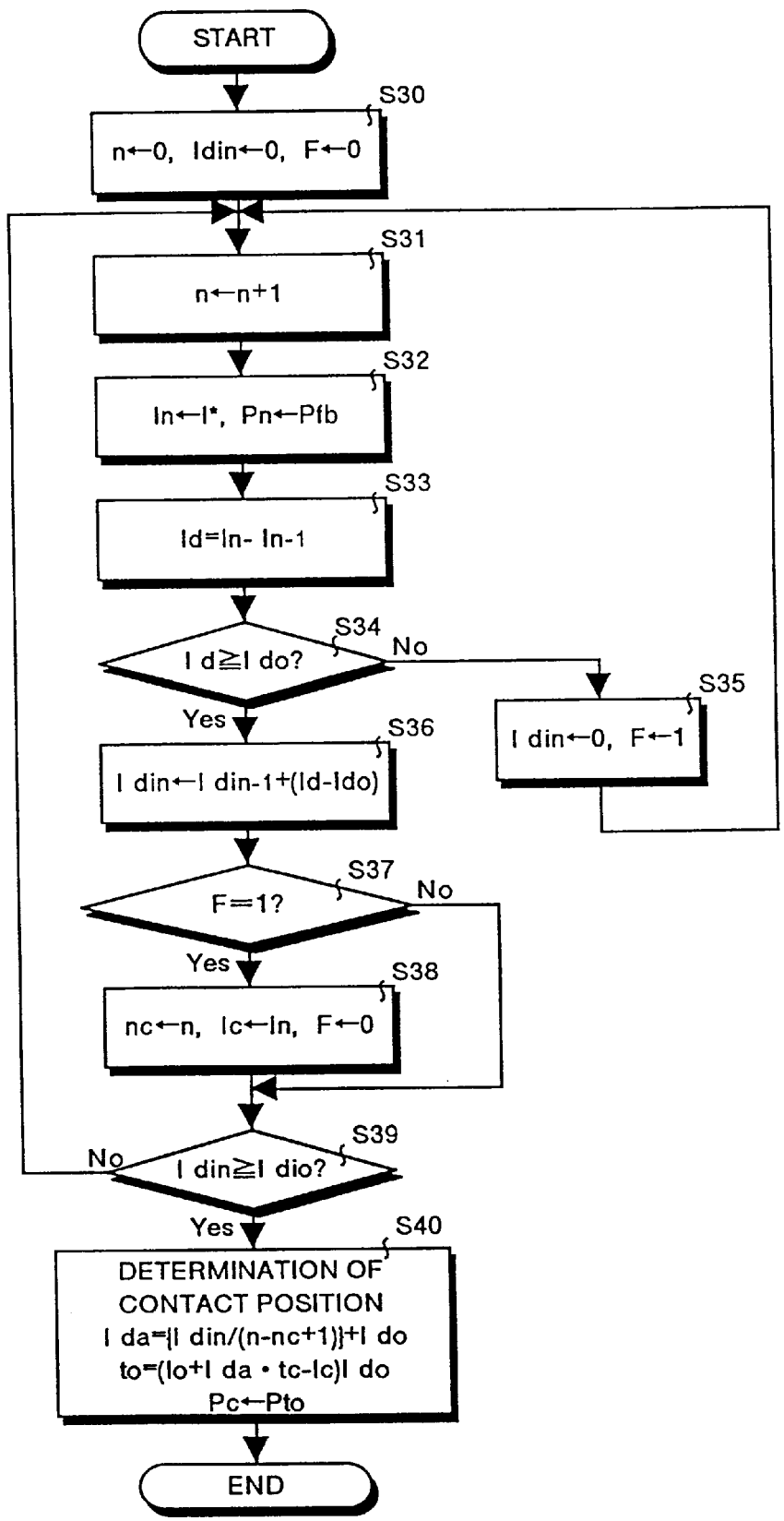
FIG. 12 is a flow chart showing an operational flow in Embodiment 4 of the contact position detecting apparatus according to the present invention.

FIG. 12 shows a flow of operations of the contact position detecting apparatus 31*d*. Steps S30 to S37 in the flow chart shown in FIG. 12 are the same as the steps S30 to S37 in the flow chart shown in FIG. 9 for Embodiment 3, so that description thereof is omitted herein.

In a flow of operations in Embodiment 4, when it is determined that F is equal to 1 (F=1) (step S37), namely when it is determined that the condition Id<Ido has just shifted to the condition Id≧Ido (time te or time tc in FIGS. 10A to 10D), the processing counter n at this point in time is written as a counter nc at the shift time point in the memory 65, and also the current instruction value In at this point in time is written as a current instruction value Ic at the shift time-point in the memory 65 with the flag F for resetting the accumulated value rest to 0 (step S38).

On the contrary, if it is determined that F is not equal to 1 (step S37), the counter nc at the shift point in time and the current instruction value Ic at the shift point in time are not updated and the flag F is also not reset.

The difference accumulated value determining section 69 determines whether the current difference accumulated value Idin has reached the specified value Idio (step S39). If the condition Idin≧Idio is not satisfied (step S39), system control returns to the beginning of the processing loop.

On the contrary, if the condition Idin≧Idio is satisfied (step S39), in other words, the difference accumulated value Idin has reached the specified value Idio (time tcd in FIGS. 13A to 13D), it is determined that contact has occurred, and the average value calculator 81 computes an average value Ida (average inclination of a current instruction value from the time tc to time tdc) for the current time differentiated value Id in a time zone from the time tc to time tcd. Then the estimating section 83 estimates the point in time when the current instruction value In exceeds the preset reference value Io, reads out the positional data Pto at this time-point to from the memory 65, and a position indicated by the contact position data Pc at this time-point Pto is regarded as a contact position (step S40).

The average value Ida for the current time-differentiated values Id is computed through the following equation referring to data nc or the like stored in the memory 65:

$$\text{Ida}=\{\text{Idin}/(n-nc+1)\}+\text{Ido} \tag{1}$$

Herein the straight line x (Refer to FIG. 13A) indicating the average value Ida for the current time-differentiated values Id is expressed by the following equation.

$$x=\text{Ida}.t+(\text{Ic}-\text{Ida}.tc) \tag{2}$$

Deduction of the time to when the current instruction value In exceeds the preset reference value Io is made, assuming that the straight line x indicates potential values of the current value Io, according to the following equation (3):

$$to=(\text{Io}+\text{Ida}.tc+-\text{Ic})/\text{Ida} \tag{3}$$

When to is substantially equal to no and tc to nc, the equation (3) is substantially equivalent to the following equation (4).

$$no=(\text{Io}+\text{Ida}.nc-\text{Ic})/\text{Ida} \tag{4}$$

When determination of contact is made as described above, also in this case, the tool 3 is immediately moved away from the work W in the −X direction at a high speed. With this operation, the tool 3 is prevented from being strongly pressed to the work W, and chipping of the tool 3 and biting of the tool 3 into the work W can be prevented.

As determination of contact is made as described above, the same effects as those in Embodiment 3 are achieved, and a contact position is detected with higher precision.

Figure 13A:
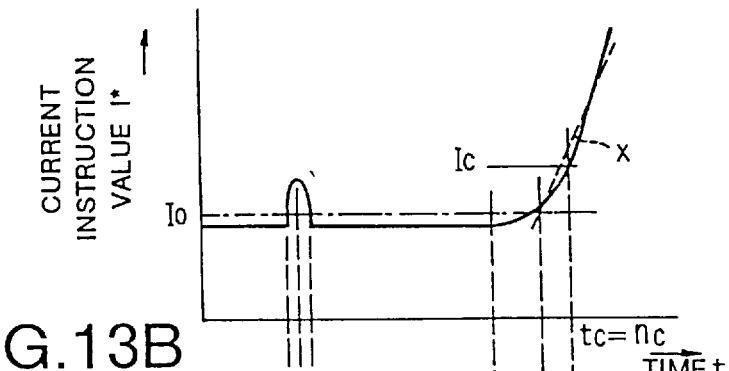
FIG. 13A is a graph showing change of a current instruction value.
Figure 13B:
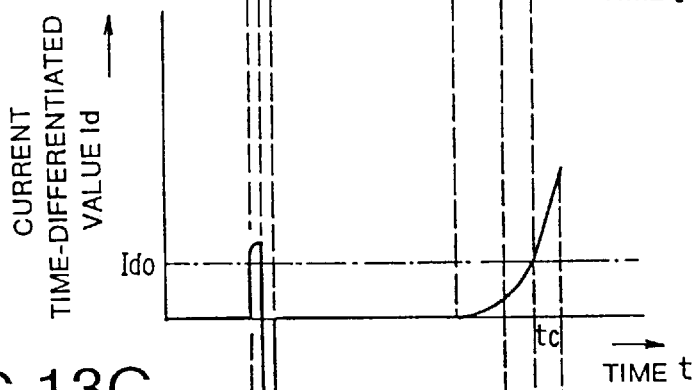
FIG. 13B is a graph showing change of a current time-differentiated value.
Figure 13C:
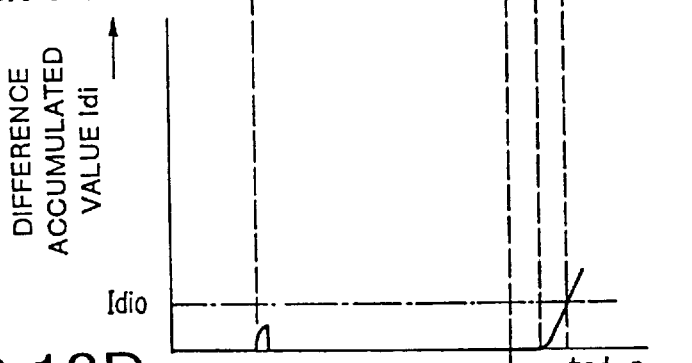
FIG. 13C is a graph showing change of a difference accumulated value.
Figure 13D:
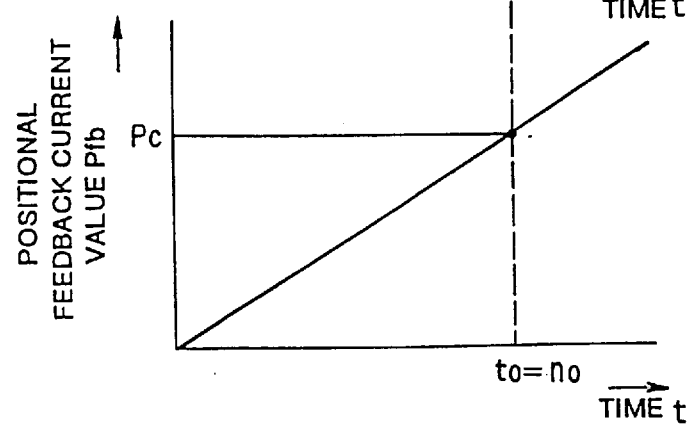
FIG. 13D is a graph showing change of a positional feedback value.

It should be noted that FIG. 13A shows change of the current instruction value I* with time, FIG. 13B shows historical change of the current time-differentiated value Id with time, FIG. 13C shows change of the difference accumulated value Idi with time, and FIG. 13D shows change of the positional feedback value Pfb with time.

Also in this embodiment, in addition to the current instruction value I* (In), any one of the speed integration instruction value Ii* in PI controls and the current feedback current Ifb may be used as a representative value for driving load to determine a difference accumulated value between a time-differentiated value for any of the values and a difference accumulated value.

Figure 14:
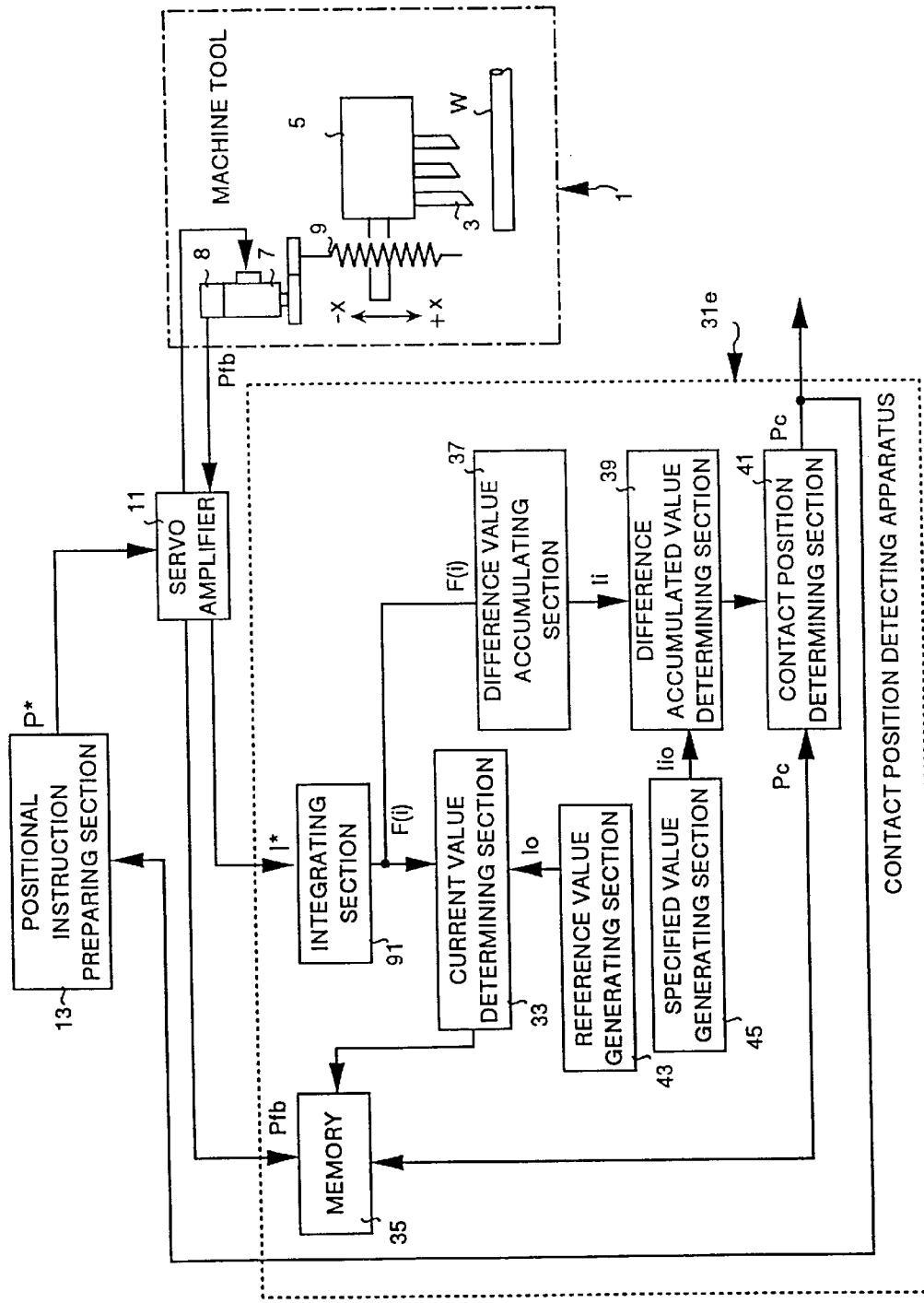
FIG. 14 is a block diagram showing Embodiment 5 of the contact position detecting apparatus according to the present invention.
Figure 15A:
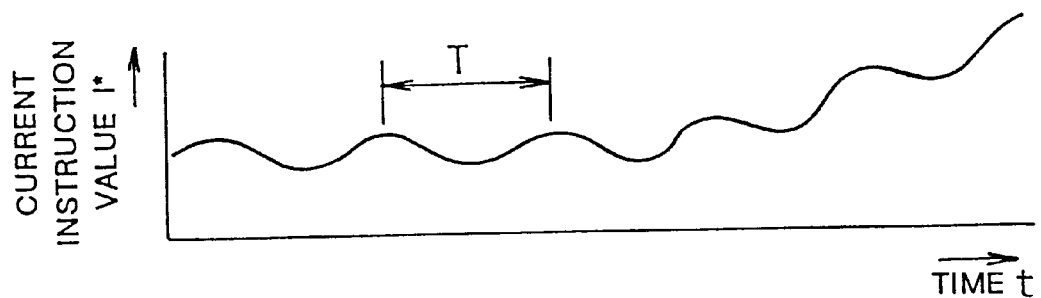
FIG. 15A is a graph showing a current instruction value before integration.
Figure 15B:
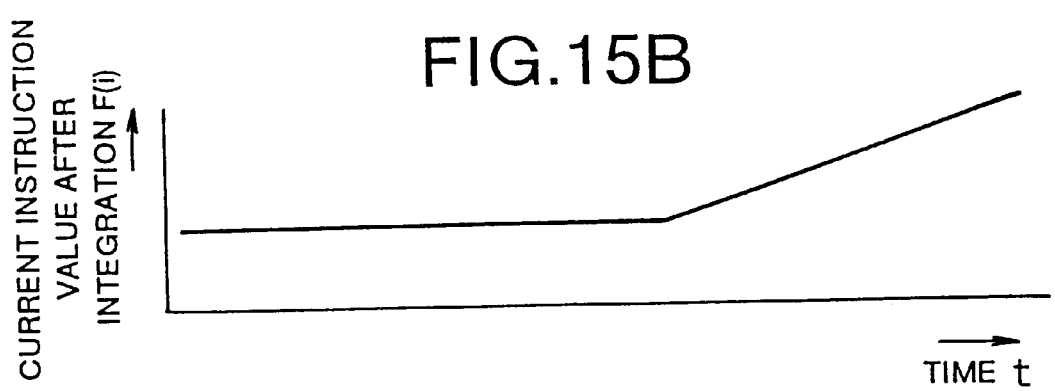
FIG. 15B is a graph showing a current instruction value after integration.

FIG. 14 to FIG. 15B show Embodiment 5 of the contact position detecting apparatus according to the present invention. It should be noted that, in FIG. 14, the same reference numerals are assigned to sections corresponding to those in FIG. 1 and description thereof is omitted herein.

In this embodiment, there is provided an integrating section 91 as shown in FIG. 14, and the integrating section 91 receives the current instruction value I* during movement of the tool 3 toward the work W (for instance, in the −X direction) from the servo amplifier 11, and integrates the current instruction value I* with the same period of time as a cycle of cyclic noise. Assuming that a period of time of one cycle of the cyclic noise is T, a current instruction value F (i) after integration is expressed by the following equation (5):

$$F(i) = I^* dt / T \quad (5)$$

The current instruction value F(i) is inputted into the current value determining section 33 as well as into the difference value accumulating section 37.

The current value determining section 33 determines whether the current instruction value F(i) after integration has exceeded the reference value Io previously set by the reference value generating section 43.

The difference value accumulating section 37 accumulates a difference (F(i)−Io) at the point in time when the current instruction value F(i) after integration exceeded the reference value Io.

The current instruction value F(i), as indicated in FIG. 15A and FIG. 15B, after integration becomes a high precision load fluctuation signal value not Including a component for cyclic noise against the current instruction value I* including cyclic noise such as components for motor chalking torque or polar ripple, which enables contact detection with high precision and prevents incorrect contact detection.

Also in this embodiment, in addition to the current instruction value I*, any one of the speed integration instruction value Ii* in PI controls and the current feedback value Ifb may be used as a representative value for driving load, and the integrating section 91 integrates these values with the same period of time as a cycle of cyclic noise.

It should be noted that Embodiment 5 can be applied to any of Embodiments 2 to 4 described above.

Figure 16:
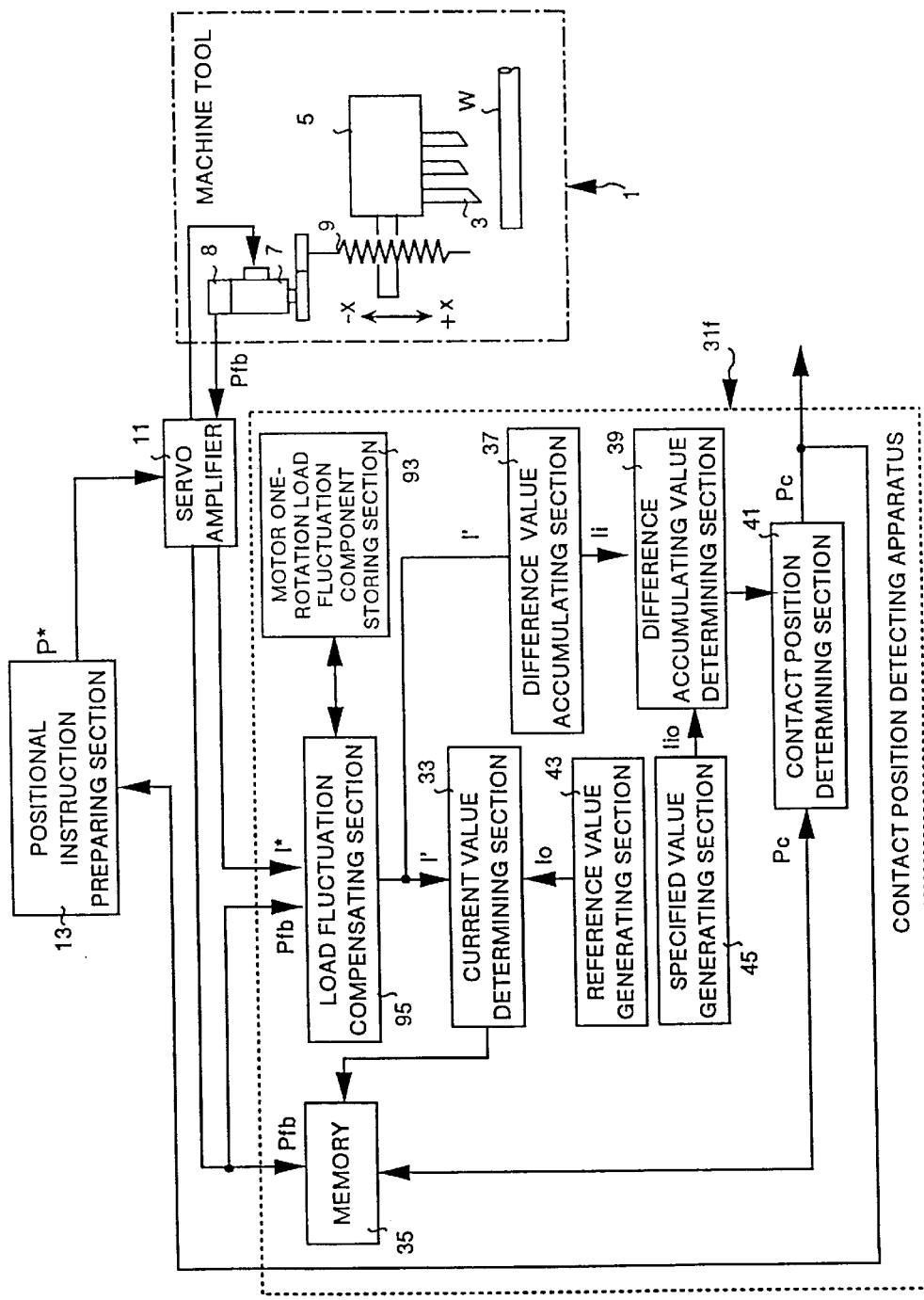
FIG. 16 is a block diagram showing Embodiment 6 of the contact position detecting apparatus according to the present invention.
Figure 17A:
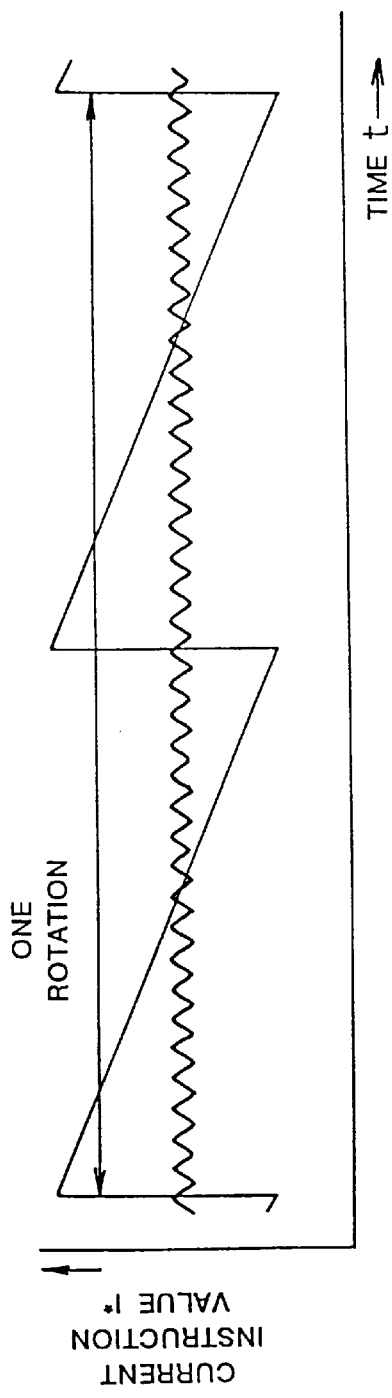
FIG. 17A is a graph showing a current instruction value before correction.
Figure 17B:
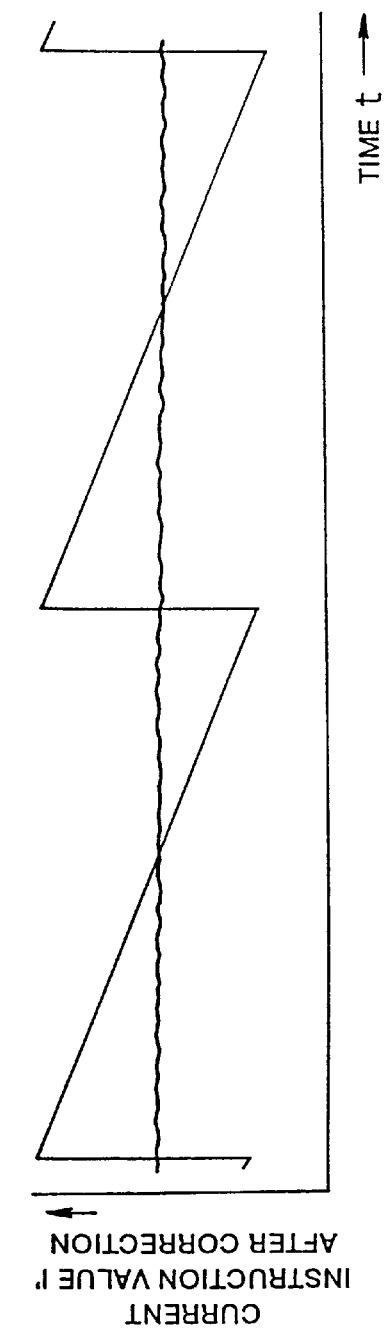
FIG. 17B is a graph showing a current instruction value after correction.

FIG. 16 to FIG. 17B show Embodiment 6 of the contact position detecting apparatus according to the present invention. In FIG. 16, the same reference numerals are assigned to the sections corresponding to those in FIG. 1 and description thereof is omitted herein.

In a contact position detecting apparatus 31f according to the present invention, as shown in FIG. 16, there are provided a motor's one rotation load fluctuation component storing section 93 for storing therein a load fluctuation component for one rotation of the motor obtained according to a measurement value for the current instruction value I* for one rotation of the servo motor 7 and a load fluctuation compensating section 95 for executing load fluctuation compensation for the current instruction value I* according to the load fluctuation component value stored in the motor's one rotation load fluctuation component storing section 93, and determination of contact is made according to a current instruction value I' after compensation of load fluctuation by the load fluctuation compensating section 95.

The current instruction value I' is inputted into the current value determining section 33 as well as into the difference value accumulating section 37, and the current value a determining section 33 determines whether the current instruction value I' after compensation for load fluctuation has exceeded the reference value Io previously set by the reference value generating section 43, and the difference value accumulating section 37 accumulates a difference (I'−Io) at a time when the current instruction value I' after compensation for load fluctuation exceeds the reference value Io.

The current instruction value I' after compensation for load fluctuation (after correction) becomes, as shown in FIG. 17A and FIG. 17B, a high precision load fluctuation signal value with cyclic noise removed there from against the current instruction value I* including cyclic noise such as a motor chalking torque or ripple component, which enables contact detection with high precision and prevention of incorrect contact detection.

Also in this embodiment, in addition to the current instruction value I*, any one of the speed integration instruction value Ii* in PI controls and the current feedback value Ifb may be used as a representative value for driving load, and the motor's one rotation load fluctuation component storing section 93 stores therein a load fluctuation component for one rotation of the motor, and the load fluctuation compensating section 95 compensates load fluctuation for any of these values.

Also, this Embodiment 6 can be applied to any of Embodiments 2 to 4.

Figure 18:
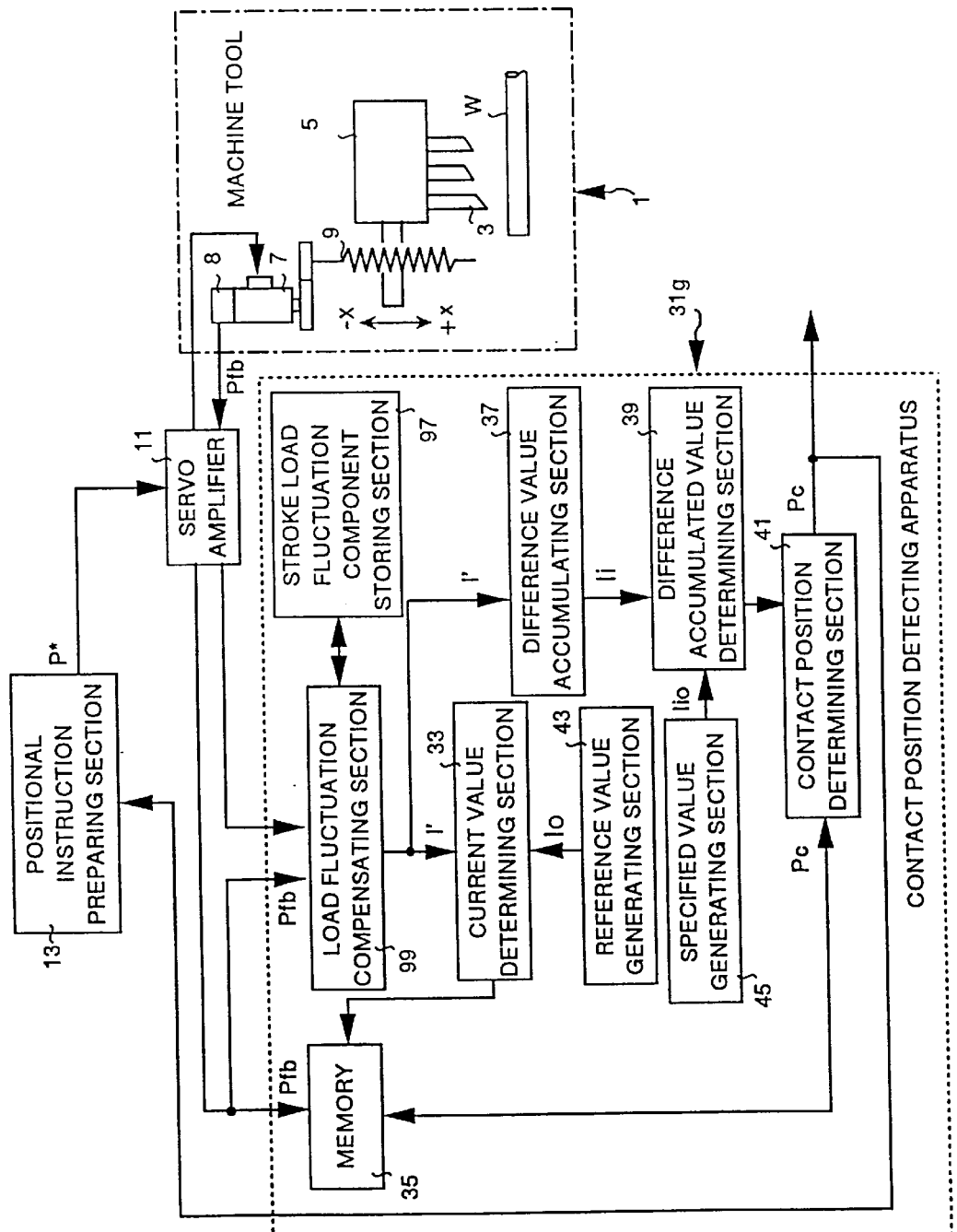
FIG. 18 is a block diagram showing Embodiment 7 of the contact position detecting apparatus according to the present invention.
Figure 19A:
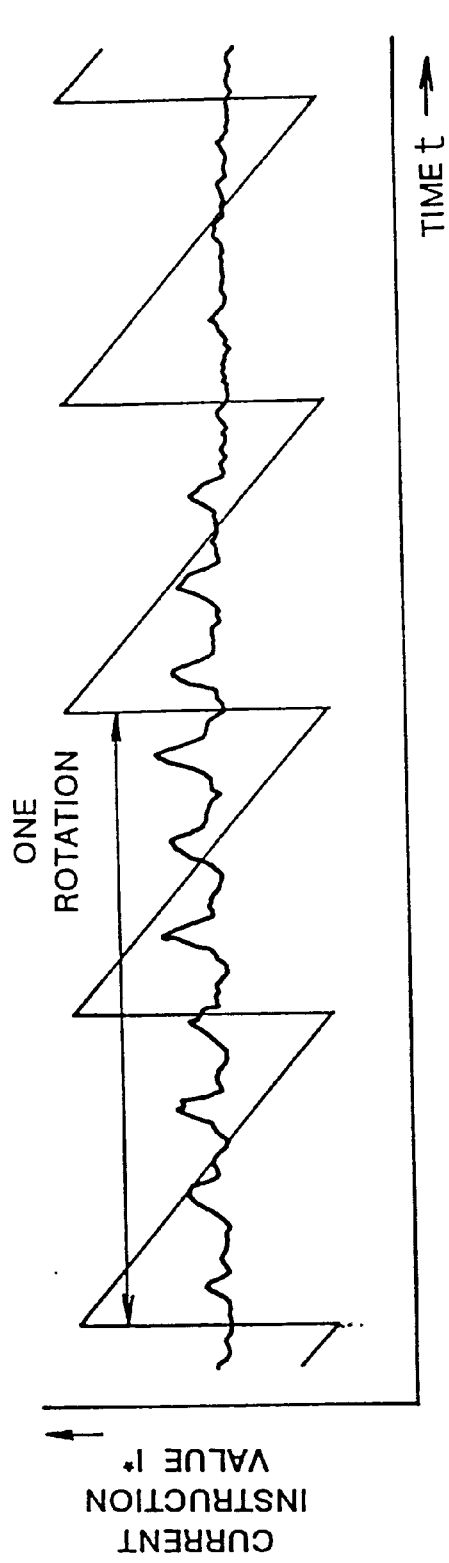
FIG. 19A is a graph showing a current instruction value before correction.
Figure 19B:
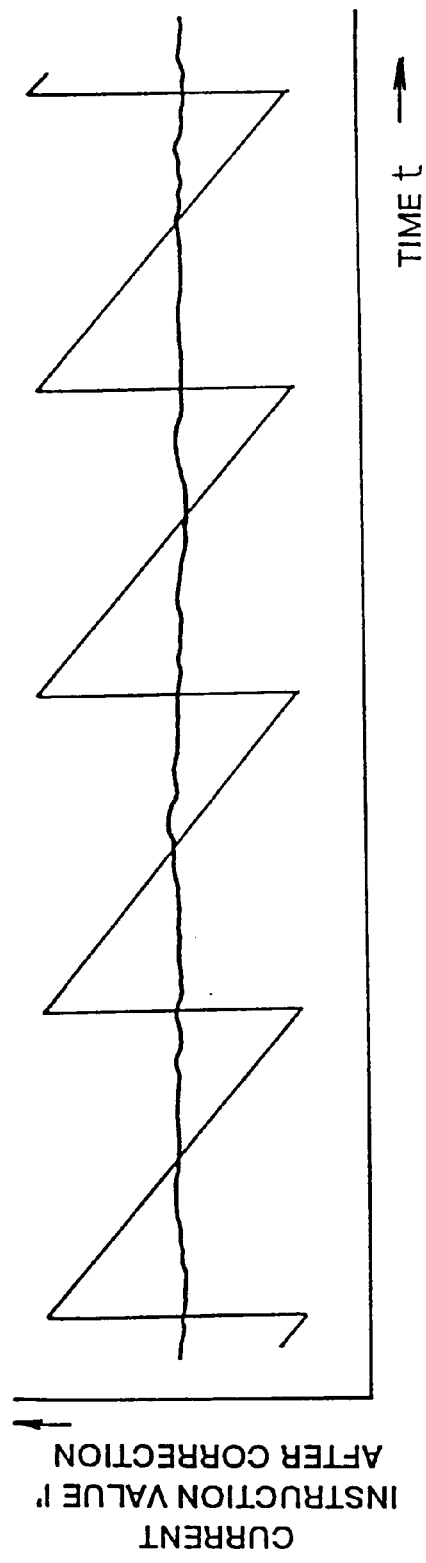
FIG. 19B is a graph showing a current instruction value after correction.

FIG. 18 to FIG. 19B show Embodiment 7 of the contact position detecting apparatus according to the present invention. In FIG. 18, the same reference numerals are assigned to sections corresponding to those in FIG. 1 and description thereof is omitted herein.

In a contact position detecting apparatus 31g according to the present invention, as shown in FIG. 18, there are provided a stroke load fluctuation component storing section 97 for storing therein a load fluctuation component value in a stroke in the X direction (for instance, in the full stroke) previously obtained from a measurement value for the current instruction value I* for one rotation of the servo motor 7 for every X coordinate, and a load fluctuation compensating section 99 for compensating load fluctuation in the current instruction value I* according to the load fluctuation component value stored in the stroke load fluctuation component storing section 97, and determination of contact is made according to the current instruction value I' after compensation for load fluctuation by the load fluctuation compensating section 99.

The current instruction value I' is inputted, like in Embodiment 7, into the current value determining section 33 as well as into the difference value accumulating section 37, and the current value determining section 33 determines whether the current instruction value I' after compensation for load fluctuation has exceeded the reference value Io previously set by the reference value generating section 43, and the difference value accumulating section 37 accumulates a difference (I'−Io) at a point in time when the current instruction value I' after compensation for load fluctuation exceeds the reference point Io.

The current instruction value I' after compensation for load fluctuation (after correction) becomes, as shown in FIG. 19A and FIG. 19B, a high precision load fluctuation signal value with load fluctuation component removed therefrom against the current instruction value I* including a load fluctuation component due to coming-in and going-out of a ball in a ball screw of a feed screw mechanism, which enables high precision contact detection and prevents incorrect detection of contact.

Also in this embodiment, in addition to the current instruction value I*, any one of the speed integration instruction value Ii* in PI controls and current feedback value Ifb may be used as a representative value for driving load, and the stroke load fluctuation component storing section 97 stores a load fluctuation component in the strokes, and in that case, the load fluctuation compensating section 99 executes compensation for the load fluctuation.

Also, this embodiment 7 can be applied to any of Embodiments 2 to 4.

Figure 20:
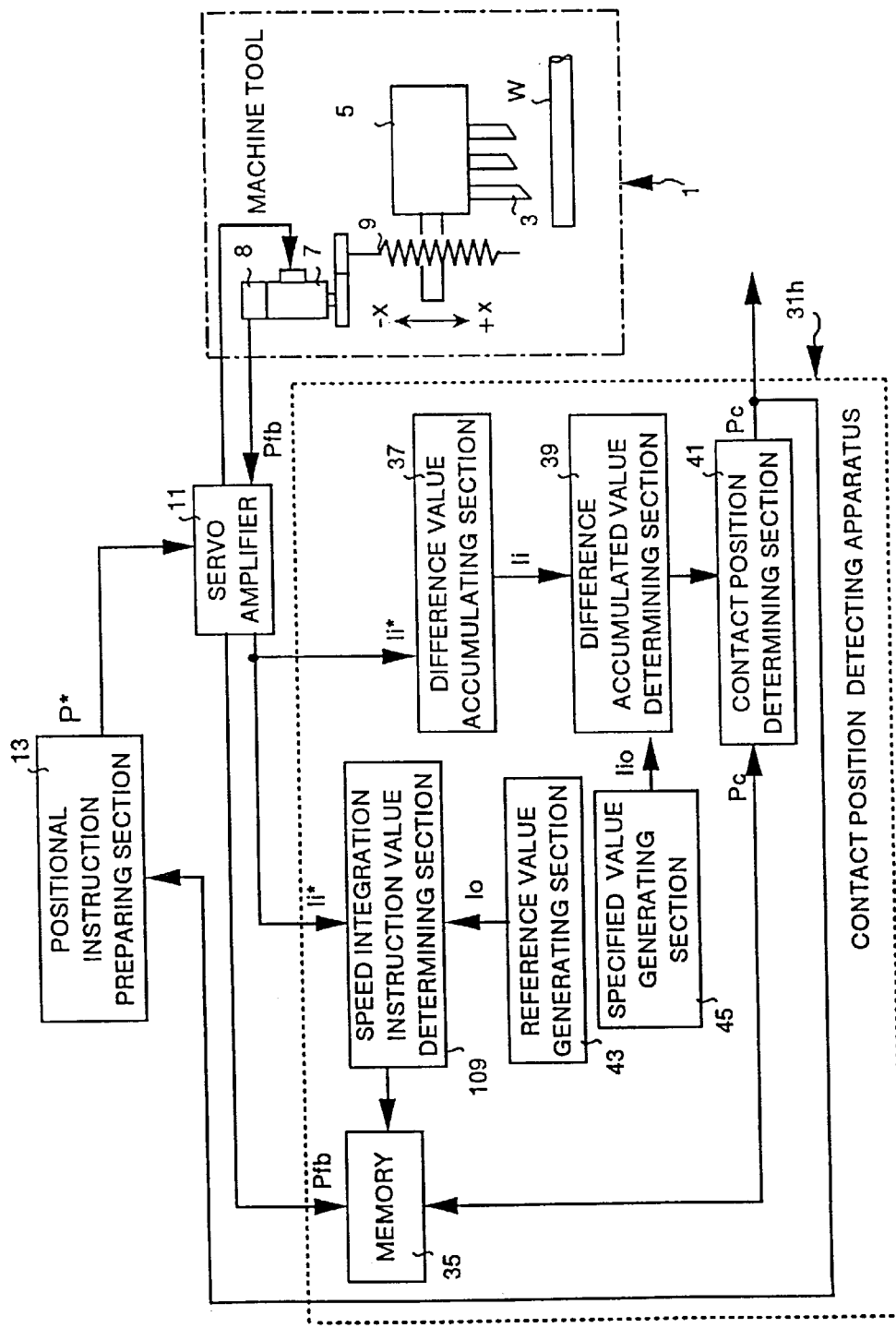
FIG. 20 is a block diagram showing Embodiment 8 of the contact position detecting apparatus according to the present invention.
Figure 21:
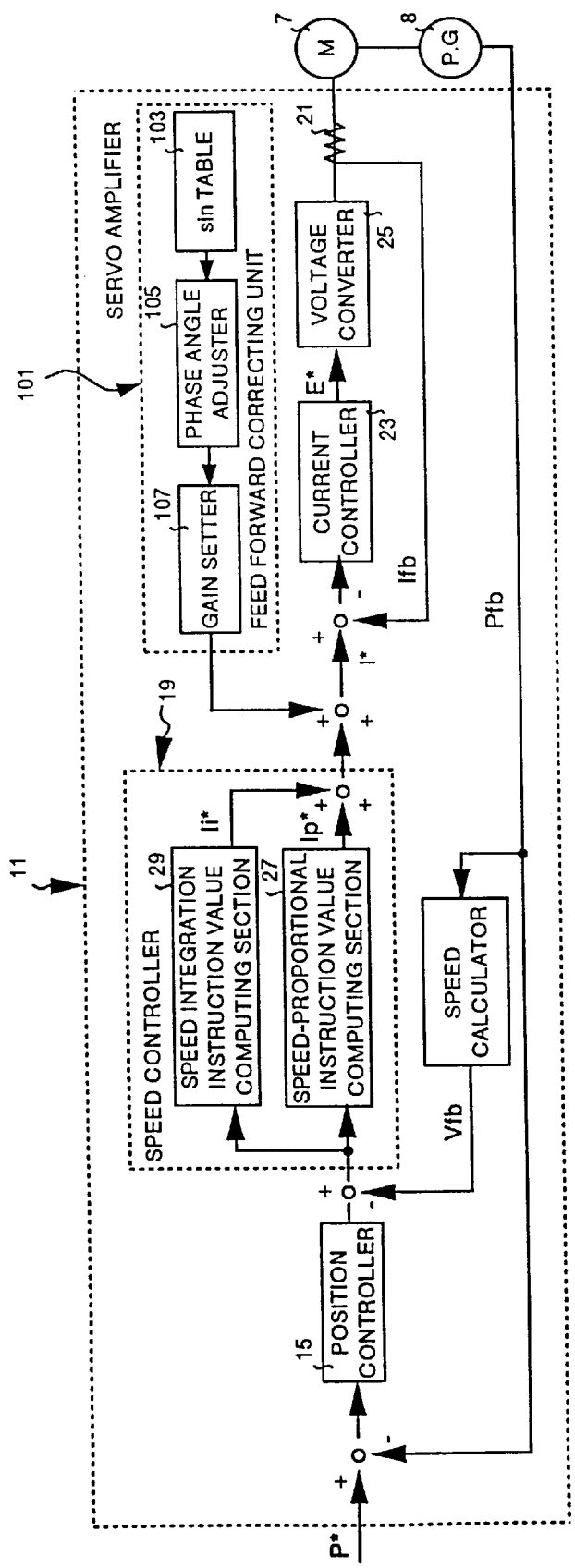
FIG. 21 is a block diagram showing a servo amplifier in Embodiment 8 of the contact position detecting apparatus according to the present invention.

FIG. 20 and FIG. 21 show Embodiment 8 of the contact position detecting apparatus according to the present invention. In FIG. 20 and FIG. 21, the same reference numerals are assigned to sections corresponding to those in FIG. 1 and FIG. 2 and description thereof is omitted herein.

In this embodiment, as shown in FIG. 21, a feed forward correcting section 101 for executing feed forward correction to a current instruction with a sinusoidal wave signal having a cycle equivalent to that of a load fluctuation component with a constant cycle and a constant amplitude specified to a motor is incorporated in the servo amplifier 11.

The feed forward correcting section 101 has a sine table with a sine function stored therein, a phase angle adjuster 105, and a gain setter 107, and executes feed forward correction with a sinusoidal wave and a phase reverse to that of a sinusoidal wave with a constant cycle and a constant amplitude appearing in the current instruction value I* due to such a factor as a motor torque polar ripple component. A phase of the sinusoidal wave used for this feed forward correction can be adjusted by the phase angle adjuster 105, while the amplitude can be adjusted by the gain setter 107.

This feed forward correction prevents disturbance in a speed control loop outside the current control loop due to external noise.

In this case, by using a current instruction value (Ip*+Ii*) before feed forward correction or the speed integration instruction value Ii* in PI controls as a representative value for driving load, a contact can be detected with high precision and incorrect contact detection is prevented without being affected by cyclic noise.

For this reason, the contact position detecting apparatus 31h according to this embodiment has a speed integration instruction current value determining section 109 for receiving the speed integration instruction value Ii* from the servo amplifier 11 in place of the current value determining section 33.

With this configuration, since the external disturbance due to cyclic noise due to motor chalking torque or a polar ripple component is eliminated, contact can be detected with high precision.

Also, Embodiment 8 can be applied to any of Embodiments 2 to 4.

Figure 22:
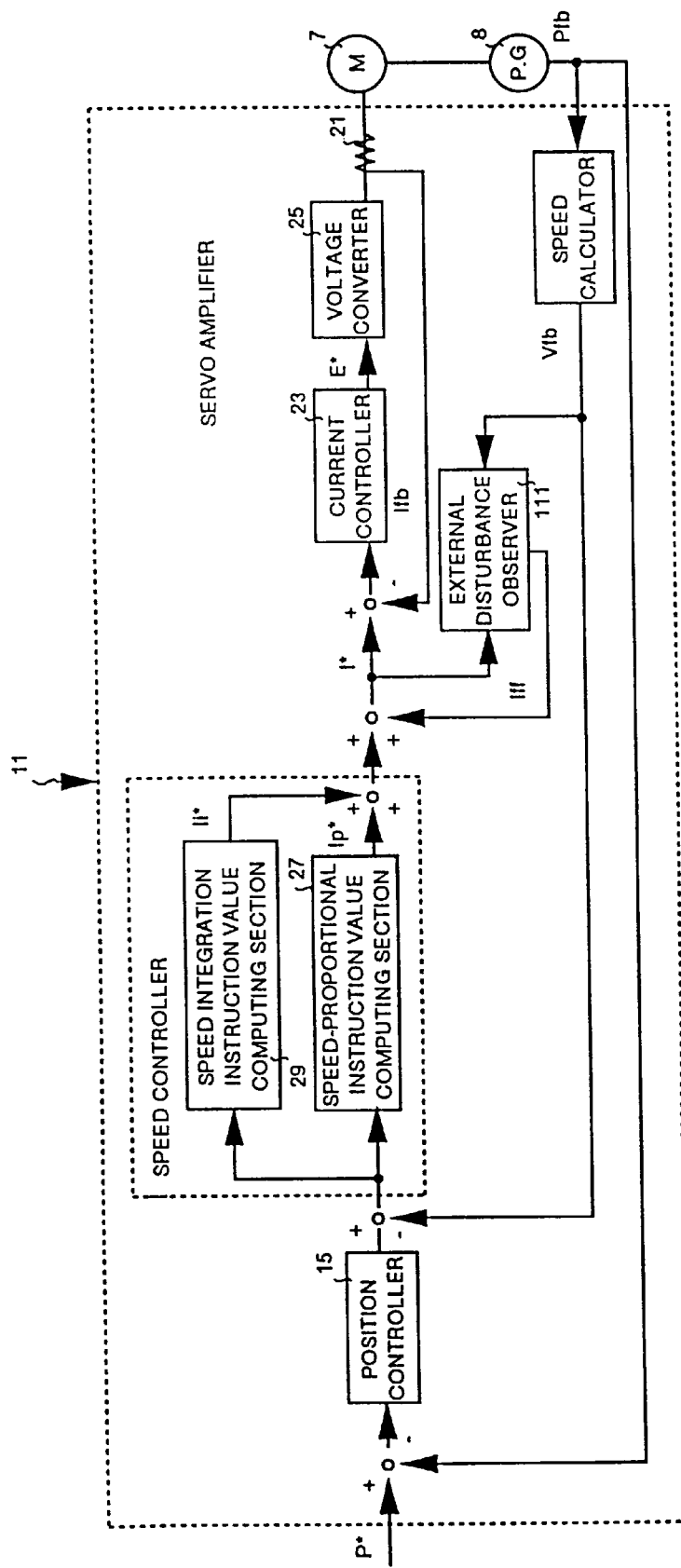
FIG. 22 is a block diagram showing a servo amplifier in Embodiment 9 of the contact position detecting apparatus according to the present invention.

FIG. 22 shows Embodiment 9 of the contact position detecting apparatus according to the present invention. In FIG. 22, the same reference numerals are assigned to sections corresponding to those in FIG. 2 and description thereof is omitted herein. The contact position detecting apparatus 31h according to this embodiment may be the same one as that in Embodiment 9 and the drawing thereof is not described herein.

As shown in FIG. 22, an external disturbance observer 111 is provided in the servo amplifier. The external disturbance observer 111 computes an external disturbance compensating current value Iff, and functions as a feed forward correcting section for executing feed forward correction to the current instruction value I* according to the external disturbance compensating current value Iff.

As is well known in the art, the external disturbance observer converts a speed feedback value Vfb to an equivalent current instruction value, regards a difference between the actual current instruction value I* as external disturbance, and generates an external disturbance compensating current value Iff according to the difference.

Because of the feed forward correction by the external observer 111, the speed control loop outside the current control loop is not affected by noise due to external disturbance.

Also in this embodiment, by using a current instruction value (Ip*+Ii*) before feed forward correction or a speed integration instruction value Ii* in PI controls as a representative value for driving load, contact detection with high precision becomes possible with incorrect contact detection prevented and also without being affected by noise due to external disturbance.

Also, this Embodiment 9 may be applied to any of Embodiments 2 to 4 described above.

As understood from the above description, with the contact position detecting method according to the present invention, a contact is determined based on a difference-accumulated value between a representative value for driving load and a reference value, and a position, indicated by positional data for the body at a point in time when the representative value for driving load exceeds a reference value, is regarded as a contact position, so that incorrect detection is not made even when temporary load fluctuations (external disturbance) are generated due to a feed screw or the like, and a contact position can be detected with high precision and high reliability with incorrect contact detection being prevented.

With the contact position detecting method according to another aspect of the present invention, a contact is determined based on a time-differentiated value for a representative value for driving load, and a contact position is indicated by positional data for the body at a point in time when a time-differentiated value for the representative value for driving load exceeds the reference value, so that, even if DC in load data during constant speed feed changes due to change in viscosity of a machine or for some other reasons, a contact position can be detected with high reliability with incorrect contact detection prevented.

With the contact position detecting method according to another aspect of the present invention, a contact is determined based on an accumulated value of a difference between a time-differentiated value for a representative value for driving load and a reference value, and a position, indicated by positional data for the body at a point in time when the time-differentiated value for the representative value for driving load exceeds the reference value, is regarded as a contact position, so that, even if temporary load fluctuations (external disturbance) are generated due to a feed screw or the like, or even if DC in load data during constant speed feed changes due to change in viscosity of a machine or the like, a contact position can be detected with high reliability and incorrect contact detection being prevented.

With the contact position detecting method according to another aspect of the present invention, a contact is determined based on a difference-accumulated value between a time-differentiated value for a representative value for driving load and a reference value, and when a difference-accumulated value for this time-differentiated value exceeds a specified value, a point in time when the representative value for driving load exceeded a preset reference value is estimated from an average value of the time-differentiated value from a point in time when the time-differentiated value exceeded the reference value until a point in time when the difference-accumulated time reaches a specified time, and a position indicated by positional data for the body at the estimated time is regarded as a contact position, so that, even if load fluctuations (external disturbance) temporally occur due to a feed screw or the like, or even if DC in load data during constant speed feed changes due to change in viscosity of a machine or the like, a contact position is detected with high reliability and high precision with incorrect contact detection prevented.

With the contact position detecting method according to another aspect of the present invention, a representative value for driving load with cyclic noise such as motor chalking torque or a polar ripple component removed therefrom is used, so that contact can be detected with high precision and incorrect contact detection is prevented without being affected by the cyclic noises as described above.

With the contact position detecting method according to another aspect of the present invention, a representative load for driving load with a cyclic load fluctuation component for each rotation of a motor removed therefrom is used, so that contact can be detected with high precision and incorrect contact detection is prevented without being affected by cyclic noises such as a motor chalking torque or a polar ripple component.

With the contact position detecting method according to another aspect of the present invention, a representative load for driving load with a load fluctuation component during movement of the body removed therefrom, so that contact can be detected with high precision and incorrect contact detection is prevented without being affected by load fluctuation such as coming-in and going-out of a ball of a ball screw in a feed screw mechanism.

With the contact position detecting method according to another aspect of the present invention, a load fluctuation with a contact cycle and a constant amplitude specific to a motor is canceled by way of feed forward correction, and a current instruction value before feed forward correction or a speed integration instruction value in PI controls is used as a representative load for driving load, so that contact can be detected with high precision and incorrect contact detection is prevented without being affected by cyclic noises such as a motor chalking torque or a polar ripple component.

With the contact position detecting method according to another aspect of the present invention, a component for external disturbance is excluded by executing feed forward correction to a current instruction according to an external disturbance compensating value provided from an external disturbance observer, and a current instruction value before the feed forward correction or a speed integration instruction value in PI controls is used as a representative load for driving load, so that contact can be detected with high precision and incorrect contact detection is prevented without being affected by noises due to external disturbance.

With the contact position detecting method according to another aspect of the present invention, when a movable body contacts an object for contact, the movable body is immediately moved away from the object for contact, so that a movable body such as a tool is prevented from being strongly pressed to a work or the like and also chipping of the tool or biting of the tool into the work is prevented, whereby a sound state of the tool or the object for contact is maintained.

With the contact position detecting apparatus according to another aspect of the present invention, a contact is determined based on a difference accumulated value between a representative value for driving load and a reference value, and when the difference accumulated value exceeds a specified value, a position indicated by positional data at a point of time when the difference accumulated value exceeds the representative value for driving load is regarded as a contact position, so that, even if temporary load fluctuations (external disturbance) occur due to a feed screw or the like, incorrect contact detection is never made and a contact position can be detected with high precision and high reliability.

With the contact position detecting apparatus according to another aspect of the present invention, a contact is determined based on a time-differentiated value for a representative value for driving load, and a contact position is indicated by positional data for the body at a point in time when a time-differentiated value for the representative value for driving load exceeds a specified value, so that, even if DC in load data fluctuates during constant speed feed due to change in viscosity of a machine or the like, contact can be detected with high precision with incorrect contact detection prevented.

With the contact position detecting apparatus according to another aspect of the present invention, a contact is determined based on a difference accumulated value between a time-differentiated value for a representative load for driving load and a reference value, and when a difference accumulated value for the time-differentiated value exceeds a specified value, a position, indicated by positional data at a point in time when the time-differentiated value for the representative load for driving load exceeds the reference value, is regarded as a contact position, so that, even if temporary load fluctuation (external disturbance) is generated due to a feed screw or the like, or even if DC in load data during constant speed feed changes due to change in viscosity of a machine or the like, incorrect contact detection is prevented and a contact position can be detected with high reliability.

With the contact position detecting apparatus according to another aspect of the present invention, a contact is determined based on a difference accumulated value between a time-differentiated value for a representative value for driving load and a reference value, and when the difference accumulated value for this time-differentiated value exceeds a specified value, a point in time when the representative value for driving load exceeds a preset reference value is estimated from an average value of the time-differentiated value from the point in time when the time-differentiated value exceeds the reference value until a point in time when the difference accumulated value reaches a specified time, and a position indicated by the positional data at the estimated point in time is regarded as a contact position, so that, even if temporary load fluctuations (external disturbance) are generated due to a feed screw or the like, or even if DC in load data during constant speed feed changes due to change in viscosity of a machine or the like, incorrect contact detection is prevented and a contact position can be detected with high reliability.

With the contact position detecting apparatus according to another aspect of the present invention, a representative load for driving load with cyclic noise such as motor chalking torque or a polar ripple component removed therefrom is used, so that incorrect contact detection is prevented and contact position is made with high precision without being affected by the cyclic noises as described above.

With the contact position detecting apparatus according to another aspect of the present invention, a representative load for driving load with a cyclic load fluctuation component for each rotation of a motor is used, so that incorrect contact position is prevented and contact can be detected with high precision without being affected by cyclic noises such as a motor chalking torque or a polar ripple component.

With the contact position detecting apparatus according to another aspect of the present invention, a representative load for driving load with a load fluctuation component during movement of a movable body removed therefrom is used, so that, incorrect contact detection is prevented and contact is detected with high precision without being affected by load fluctuation such as coming-in and going-out of a ball in a ball screw in a feed screw mechanism.

With the contact position detecting apparatus according to another aspect of the present invention, a load fluctuation component with a constant cycle and a constant amplitude specified to a motor is calculated in a current instruction by way of feed forward correction, and a current instruction value before feed forward correction or a speed integration instruction value in PI controls is used, so that incorrect contact detection is prevented and contact is detected with high precision without being affected by cyclic noises such as motor chalking torque or a polar ripple component.

With the contact position detecting apparatus according to another aspect of the present invention, a component for external disturbance is excluded by executing feed forward correction to a current instruction according to an external disturbance compensating current value obtained with an external disturbance observer, and a current instruction value before feed forward correction or a speed integration instruction value in PI controls is used as a representative load for driving load, so that incorrect contact detection is prevented and contact is detected with high precision without being affected by noises due to external disturbance.

With the contact position detecting apparatus according to another aspect of the present invention, when a movable body contacts an object for contact, the movable body is immediately moved away from the object for contact, so that the movable body such as a tool is prevented from being strongly pressed to a work or the like and chipping of the tool or biting of the tool into the work is prevented with the movable body and object for contact kept in the sound state.

Although the invention has been described with respect to a specific embodiment for a complete and clear disclosure, the appended claims are not to be thus limited, but are to be construed as embodying all modifications and alternative constructions that may occur to one skilled in the art which fairly fall within the basic teaching herein set forth.

What is claimed is:

1. A contact position determining method for detecting a contact position at which a movable body contacts an object for contact comprising:

moving said body in a direction said object;

determining whether a representative value for driving a load, said representative value comprising at least one of: a speed integration instruction value, a current instruction value, and a current feedback value in PI controls, by a servo section providing controls for movement has exceeded a preset reference value or not;

writing positional data for said body in a memory when the representative value for driving the load exceeds the reference value;

accumulating a difference between the representative value for driving the load and the reference value after the representative value for driving the load has exceeded the reference value; and regarding a position indicated by the positional data stored in said memory as a contact position when the accumulated difference reaches a preset specified value.

2. A contact position detecting method according to claim 1 further comprising:

subjecting a speed integration instruction value, a current instruction value, or a current feedback value to integration with a time equal to the period of cyclic noise; and regarding the integrated value as a representative value for driving the load.

3. A contact position detecting method according to claim 1 further comprising:

measuring a speed integration instruction value, a current instruction value, or a current feedback value for one rotation of a motor that drives said body;

writing a load fluctuation component value computed from the measured value for one rotation of the motor in said memory for each rotation of said motor;

executing load fluctuation compensation for the speed integration instruction value, the current instruction value, or the current feedback value based on the load fluctuation component value stored in said memory; and regarding the value obtained after the compensation as the representative value for driving the load.

4. A contact position detecting method according to claim 1 further comprising:

measuring a speed integration instruction value, a current value, or a current feedback value during movement of said body;

writing a load fluctuation component value for said body at each position obtained from the measured value in said memory;

executing load fluctuation compensation for the speed integration instruction value, the current value, or the current feedback value based on the load fluctuation component value stored in said memory; and regarding the value obtained after the compensation as the representative value for driving the load.

5. A contact position detecting method according to claim 1 further comprising:

executing feed forward correction to a current instruction with a sinusoidal wave signal having a cycle equal to that of a load fluctuation component with a constant cycle and a constant amplitude specified to a motor in current instruction control in said servo section; and regarding a current instruction value before the feed forward correction or a speed integration instruction value in PI control as the representative value for driving the load.

6. A contact position detecting method according to claim 1 further comprising:

computing an external disturbance compensating current value with an external disturbance observer in current instruction control in said servo section;

executing feed forward correction to a current instruction according to the external disturbance compensating current value; and regarding a current instruction value before the feed forward correction or a speed integration instruction value in PI controls as the representative value for driving the load.

7. A contact position detecting method according to claim 1 further comprising:

immediately moving said body away from said object when a contact position is detected.

8. A contact position determining method for detecting a contact position at which a movable body contacts an object for contact comprising:

moving said body in a direction of said object;

calculating a time differentiation of a representative value for driving a load, said representative value comprising at least one of: a speed integration instruction value, a current instruction value, and a current feedback value in PI controls, by a servo section providing controls for movement;

determining whether the time-differentiated value has exceeded a preset reference value or not; and regarding a position indicated by positional data for said body as a contact position when the time-differentiated value has exceeded the reference value.

9. A contact position detecting method according to claim 8 further comprising:

subjecting a speed integration instruction value, a current instruction value, or a current feedback value to integration with a time equal to the period of cyclic noise; and regarding the integrated value as a representative value for driving the load.

10. A contact position detecting method according to claim 8 further comprising:

measuring a speed integration instruction value, a current instruction value, or a current feedback value for one rotation of a motor that drives said body;

writing a load fluctuation component value computed from the measured value for one rotation of the motor in said memory for each rotation of said motor;

executing load fluctuation compensation for the speed integration instruction value, the current instruction value, or the current feedback value based on the load fluctuation component value stored in said memory; and regarding the value obtained after the compensation as the representative value for driving the load.

11. A contact position detecting method according to claim 8 further comprising:

measuring a speed integration instruction value, a current value, or a current feedback value during movement of said body;

writing a load fluctuation component value for said body at each position obtained from the measured value in said memory;

executing load fluctuation compensation for the speed integration instruction value, the current value, or the current feedback value based on the load fluctuation component value stored in said memory; and regarding the value obtained after the compensation as the representative value for driving the load.

12. A contact position detecting method according to claim 8 further comprising:

executing feed forward correction to a current instruction with a sinusoidal wave signal having a cycle equal to that of a load fluctuation component with a constant cycle and a constant amplitude specified to a motor in current instruction control in said servo section; and regarding a current instruction value before the feed forward correction or a speed integration instruction value in PI control as the representative value for driving the load.

13. A contact position detecting method according to claim 8 further comprising:

computing an external disturbance compensating current value with an external disturbance observer in current instruction control in said servo section;

executing feed forward correction to a current instruction according to the external disturbance compensating current value; and regarding a current instruction value before the feed forward correction or a speed integration instruction value in PI controls as the representative value for driving the load.

14. A contact position detecting method according to claim 8 further comprising:

immediately moving said body away from said object when a contact position is detected.

15. A contact position determining method for detecting a contact position at which a movable body contacts an object for contact comprising:

moving said body in a direction of said object;

calculating a time differentiation of a representative value for driving a load, said representative value comprising at least one of: a speed integration instruction value, a current instruction value, and a current feedback value in PI controls, by a servo section providing controls for movement;

determining whether the time-differentiated value has exceeded a preset reference value or not;

writing positional data for said body in a memory when the time-differentiated value has exceeded the reference value;

accumulating a difference between the time-differentiated value and the reference value after the time-differentiated value has exceeded the reference value; and regarding a position indicated by the positional data stored in said memory as a contact position when the accumulated value has reached a preset specified value.

16. A contact position detecting method according to claim 15 further comprising:

subjecting a speed integration instruction value, a current instruction value, or a current feedback value to integration with a time equal to the period of the cyclic noise; and regarding the integrated value as a representative value for driving the load.

17. A contact position detecting method according to claim 15 further comprising:

measuring a speed integration instruction value, a current instruction value, or a current feedback value for one rotation of a motor that drives said body;

writing a load fluctuation component value computed from the measured value for one rotation of the motor in said memory for each rotation of said motor;

executing load fluctuation compensation for the speed integration instruction value, the current instruction value, or the current feedback value based on the load fluctuation component value stored in said memory; and regarding the value obtained after the compensation as the representative value for driving the load.

18. A contact position detecting method according to claim 15 further comprising:

measuring a speed integration instruction value, a current value, or a current feedback value during movement of said body;

writing a load fluctuation component value for said body at each position obtained from the measured value in said memory;

executing load fluctuation compensation for the speed integration instruction value, the current value, or the current feedback value based on the load fluctuation component value stored in said memory; and regarding the value obtained after the compensation as the representative value for driving the load.

19. A contact position detecting method according to claim 15 further comprising:

executing feed forward correction to a current instruction with a sinusoidal wave signal having a cycle equal to that of a load fluctuation component with a constant cycle and a constant amplitude specified to a motor in current instruction control in said servo section; and regarding a current instruction value before the feed forward correction or a speed integration instruction value in PI control as the representative value for driving the load.

20. A contact position detecting method according to claim 15 further comprising:

computing an external disturbance compensating current value with an external disturbance observer in current instruction control in said servo section;

executing feed forward correction to a current instruction according to the external disturbance compensating current value; and regarding a current instruction value before the feed forward correction or a speed integration-instruction value in PI controls as the representative value for driving the load.

21. A contact position detecting method according to claim 15 further comprising:

immediately moving said body away from said object when a contact position is detected.

22. A contact position determining method for detecting a contact position at which a movable body contacts an object for contact comprising:

moving said body in a direction of said object;

writing positional data for said body during this movement in time series in a memory;

calculating a time-differentiation of a representative value for driving a load, said representative value comprising at least one of: a speed integration instruction value, a current instruction value, and a current feedback value in PI controls, by a servo section providing controls for movement;

determining whether the time-differentiated value has exceeded a preset reference value or not;

accumulating a difference between the time-differentiated value and the reference value at the point in time and on, when the time-differentiated value has exceeded the reference value;

calculating an average of the time-differentiated values between the point in time when the time-differentiated value has exceeded the reference value and the accumulated difference value has reached the specified value when the time-differentiated value exceeds the reference value, and estimating a point in time when the representative value for driving the load has exceeded the preset reference value;

reading out positional data at the estimated point in time from said memory; and regarding a position indicated by the positional data as a contact position.

23. A contact position detecting method according to claim 22 further comprising:

subjecting a speed integration instruction value, a current instruction value, or a current feedback value to integration with a time equal to the period of a cyclic noise; and regarding the integrated value as a representative value for driving the load.

24. A contact position detecting method according to claim 22 further comprising:

measuring a speed integration instruction value, a current instruction value, or a current feedback value for one rotation of a motor that drives said body;

writing a load fluctuation component value computed from the measured value for one rotation of the motor in said memory for each rotation of said motor;

executing load fluctuation compensation for the speed integration instruction value, the current instruction value, or the current feedback value based on the load fluctuation a component value stored in said memory; and regarding the value obtained after the compensation as the representative value for driving the load.

25. A contact position detecting method according to claim 22 further comprising:

measuring a speed integration instruction value, a current value, or a current feedback value during movement of said body;

writing a load fluctuation component value for said body at each position obtained from the measured value in said memory;

executing load fluctuation compensation for the speed integration instruction value, the current value, or the current feedback value based on the load fluctuation component value stored in said memory; and regarding the value obtained after the compensation as the representative value for driving the load.

26. A contact position detecting method according to claim 22 further comprising the steps of:

executing feed forward correction to a current instruction with a sinusoidal wave signal having a cycle equal to that of a load fluctuation component with a constant cycle and a constant amplitude specified to a motor in current instruction control in said servo section; and regarding a current instruction value before the feed forward correction or a speed integration instruction value in PI control as the representative value for driving the load.

27. A contact position detecting method according to claim 22 further comprising:

computing an external disturbance compensating current value with an external disturbance observer in current instruction control in said servo section;

executing feed forward correction to a current instruction according to the external disturbance compensating current value; and regarding a current instruction value before the feed forward correction or a speed integration instruction value in PI controls as the representative value for driving the load.

28. A contact position detecting method according to claim 22 further comprising:

immediately moving said body away from said object when a contact position is detected.

* * * * *